US012550135B2

(12) United States Patent
Elshafie et al.

(10) Patent No.: US 12,550,135 B2
(45) Date of Patent: Feb. 10, 2026

(54) MULTIPLE INTERFACE RESOURCE SKIPPING

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 416 days.

(21) Appl. No.: 18/301,828

(22) Filed: Apr. 17, 2023

(65) Prior Publication Data

US 2024/0349272 A1 Oct. 17, 2024

(51) Int. Cl.
*H04W 72/1263* (2023.01)
*H04W 72/02* (2009.01)

(52) U.S. Cl.
CPC ....... *H04W 72/1263* (2013.01); *H04W 72/02* (2013.01)

(58) Field of Classification Search
CPC .. H04W 72/1263; H04W 72/02; H04W 72/23
See application file for complete search history.

(56) References Cited

U.S. PATENT DOCUMENTS

2021/0314967 A1* 10/2021 Wang ................ H04W 72/0453
2024/0244581 A1* 7/2024 Esswie ................ H04W 68/005

* cited by examiner

*Primary Examiner* — Chae S Lee
(74) *Attorney, Agent, or Firm* — Holland & Hart LLP

(57) ABSTRACT

Methods, systems, and devices for wireless communications are described. A first UE may receive a first configuration of a first configured grant indicating a first set of resources for a first interface between the UE and a second UE, and may receive a second configuration of a second configured grant indicating a second set of resources for a second interface between the UE and a network entity. The UE may determine to skip one or more communication occasions of the first set of resources, the second set of resources, or both. The UE may transmit, to a communication device including the second UE, the network entity, or both, an indication of the one or more communication occasions that are skipped.

30 Claims, 17 Drawing Sheets

MULTIPLE INTERFACE RESOURCE SKIPPING

FIELD OF TECHNOLOGY

The following relates to wireless communications, including multiple interface resource skipping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multiple interface resource skipping. For example, the described techniques provide for a user equipment (UE) to receive a configuration of a first configured grant indicating resources for communications performed using a first interface (e.g., a sidelink communication link or sidelink interface between the UE and a second UE). The UE may also receive a configuration of a second configured grant indicating a resources for a second interface (e.g., an access communication link or access link interface between the UE and a network entity). Based on the configured grants, the UE may determine to skip one or more communication occasions (e.g., occasions for receiving or transmitting signals) of the sets of resources, and may transmit an indication of the one or more communication occasions that are skipped to one or more communication devices. For example, the UE may transmit the indication to a network entity directly using an access communication link. Additionally, or alternatively, the UE may transmit the indication to a second UE using a sidelink, where the second UE may transmit another indication to the network entity based on the received indication (e.g., may relay the indication or combine with other indications). In some examples, the indication may include one or more separate indications or a common indication of one or more component carriers of the first interface, the second interface, or both, where the component carriers may include the one or more skipped communication occasions. The indication may also indicate one or more resource pools of the one or more component carriers. In some cases, the indication may include multiple indications transmitted using one or more common or separate resources (e.g., configured at the UE by a network entity).

A method for wireless communications at a user equipment (UE) is described. The method may include receiving a first configuration of a first configured grant indicating a first set of resources for performing communications using a first interface that includes a sidelink communication link between the UE and a second UE, receiving a second configuration of a second configured grant indicating a second set of resources for performing communications using a second interface that includes an access communication link between the UE and a network entity, determining to skip one or more communication occasions of the first set of resources of the first interface, the second set of resources of the second interface, or both, and transmitting, to a communication device, an indication of the one or more communication occasions of the first interface and the second interface that are skipped based on determining to skip the one or more communication occasions.

An apparatus for wireless communications at a UE is described. The apparatus may include a processor, memory coupled with the processor, and instructions stored in the memory. The instructions may be executable by the processor to cause the apparatus to receive a first configuration of a first configured grant indicating a first set of resources for performing communications using a first interface that includes a sidelink communication link between the UE and a second UE, receive a second configuration of a second configured grant indicating a second set of resources for performing communications using a second interface that includes an access communication link between the UE and a network entity, determine to skip one or more communication occasions of the first set of resources of the first interface, the second set of resources of the second interface, or both, and transmit, to a communication device, an indication of the one or more communication occasions of the first interface and the second interface that are skipped based on determining to skip the one or more communication occasions.

Another apparatus for wireless communications at a UE is described. The apparatus may include means for receiving a first configuration of a first configured grant indicating a first set of resources for performing communications using a first interface that includes a sidelink communication link between the UE and a second UE, means for receiving a second configuration of a second configured grant indicating a second set of resources for performing communications using a second interface that includes an access communication link between the UE and a network entity, means for determining to skip one or more communication occasions of the first set of resources of the first interface, the second set of resources of the second interface, or both, and means for transmitting, to a communication device, an indication of the one or more communication occasions of the first interface and the second interface that are skipped based on determining to skip the one or more communication occasions.

A non-transitory computer-readable medium storing code for wireless communications at a UE is described. The code may include instructions executable by a processor to receive a first configuration of a first configured grant indicating a first set of resources for performing communications using a first interface that includes a sidelink communication link between the UE and a second UE, receive a second configuration of a second configured grant indicating a second set of resources for performing communications using a second interface that includes an access communication link between the UE and a network entity, determine to skip one or more communication occasions of the first set of resources of the first interface, the second set of resources of the second interface, or both, and transmit, to a communication device, an indication of the one or more communication occasions of the first interface and the second interface that are skipped based on determining to skip the one or more communication occasions.

In some examples of the method, apparatuses, and non-transitory computer-readable medium described herein, determining to skip the one or more communication occasions may include operations, features, means, or instructions for determining to skip one or more first communication occasions of the first set of resources of the first interface and one or more second communication occasions of the second set of resources of the second interface, where the indication includes a joint indication of the one or more first communication occasions and the one or more second communication occasions, the one or more communication occasions including the one or more first communication occasions and the one or more second communication occasions.

In some examples of the method, apparatuses, and non-transitory computer-readable medium described herein, transmitting the indication may include operations, features, means, or instructions for transmitting an indication of one or more component carriers of the first set of resources of the first interface, one or more component carriers of the second set of resources of the second interface, or both, where the one or more component carriers include the one or more communication occasions of the first set of resources and the second set of resources that may be skipped.

In some examples of the method, apparatuses, and non-transitory computer-readable medium described herein, transmitting the indication may include operations, features, means, or instructions for transmitting an indication of one or more resource pools of each of the one or more component carriers of the first set of resources and the second set of resources, where the one or more resource pools include the one or more communication occasions of the first interface and the second interface.

Some examples of the method, apparatuses, and non-transitory computer-readable medium described herein may further include operations, features, means, or instructions for determining one or more codebooks mapping the one or more communication occasions with one or more component carriers of the first set of resources and the second set of resources and with one or more resource pools of each of the one or more component carriers, where the indication of the one or more communication occasions may be transmitted according to the one or more codebooks.

Some examples of the method, apparatuses, and non-transitory computer-readable medium described herein may further include operations, features, means, or instructions for transmitting the indication in accordance with the one or more codebooks includes multiplexing the one or more codebooks in a bit domain, in a time domain, in a frequency domain, or any combination thereof.

Some examples of the method, apparatuses, and non-transitory computer-readable medium described herein may further include operations, features, means, or instructions for receiving a control signal indicating a third set of resources for transmitting the indication of the one or more communication occasions.

In some examples of the method, apparatuses, and non-transitory computer-readable medium described herein, the third set of resources may include one or more common resources, where transmitting the indication of the one or more communication occasions may include operations, features, means, or instructions for transmitting an indication of the one or more communication occasions with an indication of the first interface and the second interface, an indication of one or more component carriers of the first set of resources and the second set of resources and including the one or more communication occasions, and an indication of one or more resource pools corresponding to each of the one or more component carriers of the first set of resources and the second set of resources.

In some examples of the method, apparatuses, and non-transitory computer-readable medium described herein, the third set of resources may include a first subset of the third set of resources and a second subset of the third set of resources, where transmitting the indication of the one or more communication occasions may include operations, features, means, or instructions for transmitting, using the first subset of the third set of resources, an indication of one or more first communication occasions of the first set of resources of the first interface that may be skipped, of one or more first component carriers of the first set of resources and including the one or more first communication occasions, of one or more first resource pools corresponding to each of the one or more first component carriers, or any combination thereof and transmitting, using the second subset of the third set of resources, an indication of one or more second communication occasions of the second set of resources of the second interface that may be skipped, of one or more second component carriers of the second set of resources and including the one or more second communication occasions, of one or more second resource pools corresponding to each of the one or more second component carriers, or any combination thereof.

Some examples of the method, apparatuses, and non-transitory computer-readable medium described herein may further include operations, features, means, or instructions for selecting one or more resources of the third set of resources based on the first interface and the second interface, one or more component carriers associated with the first set of resources of the first interface and the second set of resources of the second interface, and one or more resource pools associated with each of the one or more component carriers, where the indication of the one or more communication occasions may be transmitted using the selected one or more resources of the third set of resources.

In some examples of the method, apparatuses, and non-transitory computer-readable medium described herein, determining to skip the one or more communication occasions may include operations, features, means, or instructions for detecting one or more events including a collision associated with one or more resources of the first set of resources, the second set of resources, or a third set of resources, one or more measurements performed on the access communication link, a quantity of communications at the UE waiting to be transmitted using the first interface or the second interface, an expiration of a packet delay, or any combination thereof, where the indication of the one or more communication occasions indicates that the one or more communication occasions were skipped based on the one or more events.

Some examples of the method, apparatuses, and non-transitory computer-readable medium described herein may further include operations, features, means, or instructions for transmitting, to the communication device, a second indication of a capability of the UE to transmit the indication of the one or more communication occasions.

In some examples of the method, apparatuses, and non-transitory computer-readable medium described herein, the second indication of the capability indicates a capability of the UE to indicate that the one or more communication occasions may be skipped based on a collision associated with one or more resources of the first set of resources, the second set of resources, or a third set of resources.

In some examples of the method, apparatuses, and non-transitory computer-readable medium described herein, the second indication of the capability indicates a capability of the UE to indicate that the one or more communication occasions may be skipped based on one or more measurements performed on the access communication link, on a quantity of communications at the UE, on an expiration of a packet delay, or on any combination thereof.

In some examples of the method, apparatuses, and non-transitory computer-readable medium described herein, transmitting the indication of the one or more communication occasions to the communication device may include operations, features, means, or instructions for transmitting the indication to the second UE via the sidelink communication link using one or more resources of the first set of resources or of a third set of resources.

In some examples of the method, apparatuses, and non-transitory computer-readable medium described herein, the indication may be associated with a second indication transmitted by the second UE to the network entity and the second indication may be based on one or more indications transmitted by one or more UEs, the one or more indications including at least the indication transmitted by the UE.

In some examples of the method, apparatuses, and non-transitory computer-readable medium described herein, transmitting the indication of the one or more communication occasions to the communication device may include operations, features, means, or instructions for transmitting the indication to the network entity via the access communication link using one or more resources of the second set of resources or of a third set of resources.

In some examples of the method, apparatuses, and non-transitory computer-readable medium described herein, the indication includes one or more bitmaps, one or more codepoints within a sidelink shared channel, or both.

Some examples of the method, apparatuses, and non-transitory computer-readable medium described herein may further include operations, features, means, or instructions for determining that one or more resources of the first set of resources, the second set of resources, or both, collide with a measurement gap, determining whether to perform one or more measurements during the measurement gap based on the collision, and transmitting, to the communication device, an indication of whether the one or more measurements may be performed based on determining whether to perform the one or more measurements.

In some examples of the method, apparatuses, and non-transitory computer-readable medium described herein, the first configured grant indicates a set of multiple first physical uplink shared channel transmission occasions of the first set of resources and, the second configured grant indicates a set of multiple second physical uplink shared channel transmission occasions of the second set of resources, and the set of multiple first physical uplink shared channel transmission occasions, the set of multiple second physical uplink shared channel transmission occasions, or both, includes the one or more communication occasions.

A method for wireless communications at a network entity is described. The method may include transmitting a first configured grant indicating a first set of resources for a UE to perform communications using a first interface that includes a sidelink communication link between the UE and a second UE, transmitting a second configured grant indicating a second set of resources for the UE to perform communications using a second interface that includes an access communication link between the UE and the network entity, and receiving an indication of one or more communication occasions of the first interface and the second interface that are skipped based on transmitting the first configured grant and the second configured grant.

An apparatus for wireless communications at a network entity is described. The apparatus may include a processor, memory coupled with the processor, and instructions stored in the memory. The instructions may be executable by the processor to cause the apparatus to transmit a first configured grant indicating a first set of resources for a UE to perform communications using a first interface that includes a sidelink communication link between the UE and a second UE, transmit a second configured grant indicating a second set of resources for the UE to perform communications using a second interface that includes an access communication link between the UE and the network entity, and receive an indication of one or more communication occasions of the first interface and the second interface that are skipped based on transmitting the first configured grant and the second configured grant.

Another apparatus for wireless communications at a network entity is described. The apparatus may include means for transmitting a first configured grant indicating a first set of resources for a UE to perform communications using a first interface that includes a sidelink communication link between the UE and a second UE, means for transmitting a second configured grant indicating a second set of resources for the UE to perform communications using a second interface that includes an access communication link between the UE and the network entity, and means for receiving an indication of one or more communication occasions of the first interface and the second interface that are skipped based on transmitting the first configured grant and the second configured grant.

A non-transitory computer-readable medium storing code for wireless communications at a network entity is described. The code may include instructions executable by a processor to transmit a first configured grant indicating a first set of resources for a UE to perform communications using a first interface that includes a sidelink communication link between the UE and a second UE, transmit a second configured grant indicating a second set of resources for the UE to perform communications using a second interface that includes an access communication link between the UE and the network entity, and receive an indication of one or more communication occasions of the first interface and the second interface that are skipped based on transmitting the first configured grant and the second configured grant.

In some examples of the method, apparatuses, and non-transitory computer-readable medium described herein, the indication includes a joint indication of one or more first communication occasions of the first set of resources of the first interface and one or more second communication occasions of the second set of resources of the second interface, the one or more communication occasions including the one or more first communication occasions and the one or more second communication occasions.

In some examples of the method, apparatuses, and non-transitory computer-readable medium described herein, receiving the indication of the one or more communication occasions may include operations, features, means, or instructions for receiving an indication of one or more component carriers of the first set of resources of the first interface, one or more component carriers of the second set of resources of the second interface, or both, where the one or more component carriers include the one or more communication occasions of the first interface and the second interface that may be skipped.

In some examples of the method, apparatuses, and non-transitory computer-readable medium described herein, receiving the indication may include operations, features, means, or instructions for receiving an indication of one or more resource pools of each of the one or more component carriers of the first set of resources and the second set of resources, where the one or more resource pools include the one or more communication occasions of the first interface and the second interface that may be skipped.

In some examples of the method, apparatuses, and non-transitory computer-readable medium described herein, the indication of the one or more communication occasions may be received according to one or more codebooks, the one or more codebooks mapping the one or more communication occasions with one or more component carriers of the first set of resources and the second set of resources and with one or more resource pools of each of the one or more component carriers.

Some examples of the method, apparatuses, and non-transitory computer-readable medium described herein may further include operations, features, means, or instructions for transmitting a control signal indicating a third set of resources for transmitting the indication of the one or more communication occasions, where the indication may be received using one or more resources of the third set of resources based on transmitting the control signal.

Some examples of the method, apparatuses, and non-transitory computer-readable medium described herein may further include operations, features, means, or instructions for receiving a second indication of a capability of the UE to transmit the indication of the one or more communication occasions, where transmitting the first configured grant and the second configured grant may be based on receiving the second indication.

A method for wireless communications at a receiving UE is described. The method may include receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity and transmitting, to the network entity, a second indication of the one or more communication occasions of the first interface and the second interface that are skipped based on receiving the indication.

An apparatus for wireless communications at a receiving UE is described. The apparatus may include a processor, memory coupled with the processor, and instructions stored in the memory. The instructions may be executable by the processor to cause the apparatus to receive, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity and transmit, to the network entity, a second indication of the one or more communication occasions of the first interface and the second interface that are skipped based on receiving the indication.

Another apparatus for wireless communications at a receiving UE is described. The apparatus may include means for receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity and means for transmitting, to the network entity, a second indication of the one or more communication occasions of the first interface and the second interface that are skipped based on receiving the indication.

A non-transitory computer-readable medium storing code for wireless communications at a receiving UE is described. The code may include instructions executable by a processor to receive, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity and transmit, to the network entity, a second indication of the one or more communication occasions of the first interface and the second interface that are skipped based on receiving the indication.

In some examples of the method, apparatuses, and non-transitory computer-readable medium described herein, the indication includes a joint indication of one or more first communication occasions of the first set of resources of the first interface and one or more second communication occasions of the second set of resources of the second interface, the one or more communication occasions including the one or more first communication occasions and the one or more second communication occasions.

In some examples of the method, apparatuses, and non-transitory computer-readable medium described herein, the indication and the second indication include an indication of one or more component carriers of the first set of resources of the first interface, one or more component carriers of the second set of resources of the second interface, or both and the one or more component carriers include the one or more communication occasions of the first set of resources and the second set of resources that may be skipped.

In some examples of the method, apparatuses, and non-transitory computer-readable medium described herein, the indication and the second indication include an indication of one or more resource pools of each of the one or more component carriers of the first set of resources and the second set of resources and the one or more resource pools include the one or more communication occasions of the first interface and the second interface.

Some examples of the method, apparatuses, and non-transitory computer-readable medium described herein may further include operations, features, means, or instructions for receiving a first configured grant indicating a third set of resources for performing communications using the first interface, receiving a second configured grant indicating a fourth set of resources for performing communications using a third interface, the third interface including a second access communication link between the receiving UE and the network entity, determining to skip one or more second communication occasions of the third set of resources of the first interface, the fourth set of resources of the third interface, or both, and transmitting, to the network entity, a third indication of the one or more second communication occasions of the first interface and the third interface that may be skipped based on determining to skip the one or more second communication occasions.

In some examples of the method, apparatuses, and non-transitory computer-readable medium described herein, the second indication and the third indication may be transmitted using one or more common resources of a fifth set of resources.

In some examples of the method, apparatuses, and non-transitory computer-readable medium described herein, the second indication may be transmitted using a first subset of a fifth set of resources and the third indication may be transmitted using a second subset of the fifth set of resources.

Some examples of the method, apparatuses, and non-transitory computer-readable medium described herein may further include operations, features, means, or instructions for receiving, from one or more second transmitting UEs, one or more third indications of one or more second communication occasions that may be skipped and transmitting one or more fourth indications of the one or more second communication occasions that may be skipped based on receiving the one or more third indications.

In some examples of the method, apparatuses, and non-transitory computer-readable medium described herein, the second indication and the one or more fourth indications may be transmitted using one or more common resources of a third set of resources.

DETAILED DESCRIPTION

Figure 1:
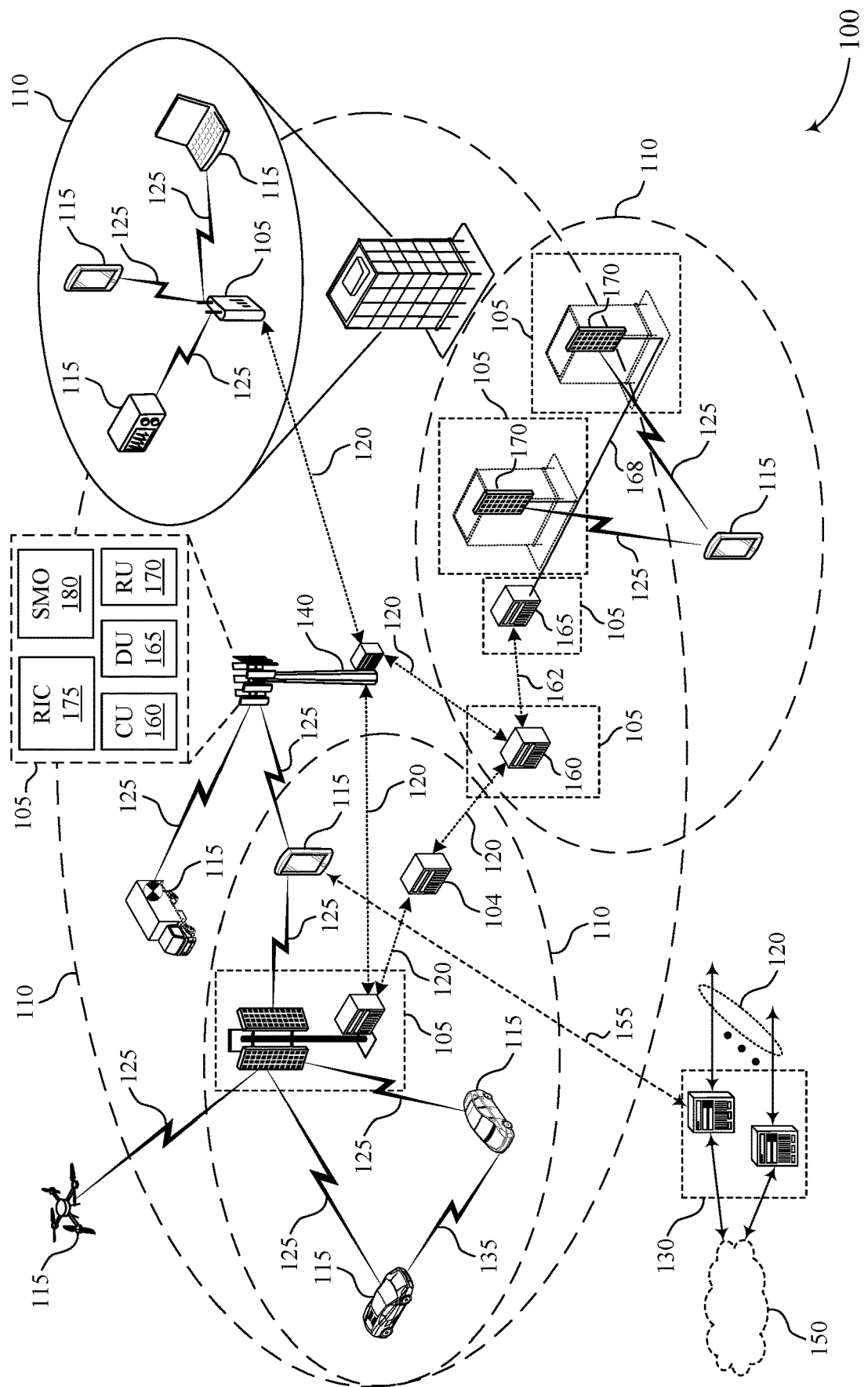
FIG. 1 shows an example of a wireless communications system that supports multiple interface resource skipping in accordance with one or more aspects of the present disclosure.

In some applications, including augmented reality, configured grants may be used to schedule resources for future communications in a wireless communications system. However, not all of the resources of a configured grant may be used based on lower than expected demand for communication bandwidth. Some wireless communication systems may support canceling, or skipping, one or more transmission occasions of one or more different communication interfaces. For example, a user equipment (UE) may perform sidelink communications (e.g., PC5 link, SL link) with a second UE and access link (e.g., Uu link) communications with a network entity. In some cases, the UE may transmit an indication of unused or skipped resources so that other devices may potentially use those skipped resources. For example, the UE may transmit an indication of skipped resources, such as transmit/receive occasions, for a single component carrier in sidelink or a single component carrier in a Uu link. However, techniques are desired for further defining indication of skipped resources.

A wireless communications system may support indications of multiple interface resource skipping. For example, a UE may transmit one or more indications of skipped resources, where the skipped resources may be over multiple interfaces (e.g., Uu or SL) or in multiple component carriers. In some examples, a UE may receive a configured grant for a sidelink (e.g., PC5) with one or more UEs and a second configured grant for an access link (e.g., Uu) with one or more network entities. The UE may determine to skip one or more communication occasions (e.g., transmit occasions and/or receive occasions for various signaling) of the first configured grant, the second configured grant, or both. The UE may transmit one or more indications of the skipped communication occasions of the sidelink and the access link to one or more devices. For example, the UE may transmit indications to a network entity over a Uu link. The UE may also transmit indications to a second UE over a PC5 link, where the second UE may be a relay UE and may relay the indications to the network entity.

In some examples, the indications may be separate according to groupings of one or more interfaces, component carriers of interfaces, resource groups (e.g., resource pools) of component carriers, individual communication occasions, or any combination thereof. Groupings may also be based on (grouped according to various resources) one or more events including data traffic, resource collisions, priorities, power management, and overlap with measurement gaps. Additionally, or alternatively, indications may be transmitted together (e.g., using multiplexing) to indicate one or more groupings of resources in one signal. In some examples, the network entity may configure the UE with the component carriers and resource pools for bundling indications of different skipped occasions together, as well as with separate or common resources for transmitting the one or more indications according to different groupings. In some examples, the UE may also transmit an indication of whether uplink communications are being used or skipped when colliding with a measurement gap (e.g., a cross-link interference (CLI) measurement gap or other measurement gap).

Aspects of the disclosure are initially described in the context of wireless communications systems. Aspects of the disclosure are further illustrated by and described with reference to wireless communications systems, resource grouping diagrams, and process flows. Aspects of the disclosure are further illustrated by and described with reference to apparatus diagrams, system diagrams, and flowcharts that relate to multiple interface resource skipping.

FIG. 1 shows an example of a wireless communications system 100 that supports multiple interface resource skipping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multiple interface resource skipping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support indications of multiple interface resource skipping. For example, a UE 115 may transmit one or more indications of skipped resources, where the skipped resources may be over multiple interfaces corresponding to one or more communication links 125, such as an NR Uu interface (e.g., an access link) or a sidelink interface (e.g., a D2D communication link 135, or PC5 link). In some examples, a UE 115 may receive a configured grant for a sidelink (e.g., PC5) with one or more UEs 115 and a second configured grant for an access link (e.g., Uu) with one or more network entities 105. The UE 115 may determine to skip one or more communication occasions (e.g., transmit occasions or receive occasions for various signaling) of the first configured grant, the second configured grant, or both, and may transmit one or more indications of the skipped communication occasions of the sidelink and the access link to one or more devices. For example, the UE 115 may transmit indications to a network entity 105 over a Uu link. The UE 115 may also transmit indications to a second UE 115 over a PC5 link, where the second UE 115 may be a relay UE 115 and may relay the indications to the network entity. In some examples, the indications and resources for transmitting the indications may be separate or common according to groupings of one or more interfaces, component carriers of interfaces, resource groups (e.g., resource pools) of component carriers, individual communication occasions, one or more events or reasons for skipping resources, or any combination thereof.

Figure 2:
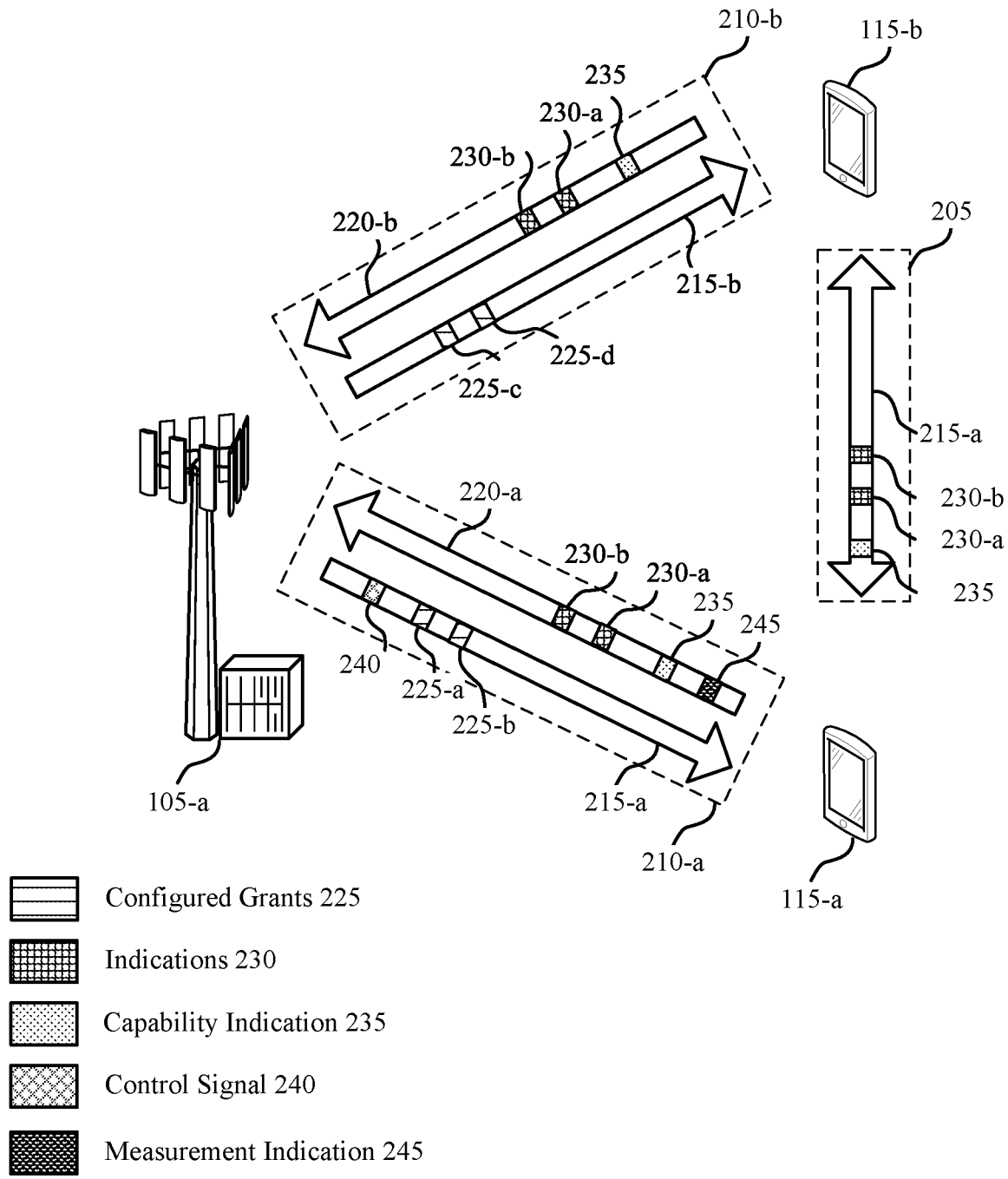
FIG. 2 shows an example of a wireless communications system that supports multiple interface resource skipping in accordance with one or more aspects of the present disclosure.

FIG. 2 shows an example of a wireless communications system 200 that supports multiple interface resource skipping in accordance with one or more aspects of the present disclosure. The wireless communications system 200 may illustrate an example for implementing one or more aspects of the wireless communications system 100. For example, the wireless communications system 200 may include a UE 115-a in communication with a UE 115-b using a sidelink interface 205, which may be examples of UEs 115 and a D2D communication link 135 described with respect to FIG. 1. In some examples, the sidelink interface 205 may be an example of a PC5 link. The wireless communications system 200 may also include a network entity 105-a in communication with the UE 115-a using an access link interface 210-a and with the UE 115-b using an access link interface 210-b, which may be examples of network entities 105, UEs 115, and communication links 125 as described with respect to FIG. 1. The access link interfaces 210-a and 210-b may, for example, be examples of Uu links for one or more uplink or downlink communications between the UEs 115 and the network entity 105-a. In some examples, the wireless communications system 200 may support indicating resource skipping across multiple interfaces according to various groupings as described herein. In some examples, the UE 115-b may represent a relay UE, or a programmable logic controller (PLC) capable of gathering and transmitting info from multiple UEs.

For example, the UE 115-a may receive one or more configurations of one or more configured grants from the network entity 105-a via a downlink communication link 215-a of the access link interface 210-a, where the configured grants may configuring one or more configured grant communication occasions. A communication occasion may represent a configured resource on which one or more signals are scheduled for reception or transmission. For example, the configured grants may configure one or more physical uplink shared channel (PUSCH) occasions for transmitting uplink data (e.g., feedback). In some examples, the UE 115-b may also receive one or more configured grants from the network entity 105-a.

In some examples, the UE 115-a (or the UE 115-b) may indicate, to the network entity 105-a, one or more unused resources corresponding to one or more communication occasions that are skipped for various communications. For example, the UE 115-*a* may not have data to transmit (e.g., may be in a lull period of a video game or other application or may not have feedback) during one or more PUSCH occasions and may skip (e.g., cancel, or not use) one or more PUSCH occasions. The UE 115-*a* may also encounter interference or collisions between communications, or may encounter a measurement gap, and may skip (e.g., cancel) one or more communication occasions due to the collisions or measurement gap. In some examples, the UE 115-*a* may transmit an indication of the skipped communication occasions to the network entity 105-*a* using (e.g., via or within) an uplink communication link 220-*a* of the access link interface 210-*a*.

In some examples, the UE 115-*a* (or the UE 115-*b*) may support dynamic indication of the skipped communication occasions (e.g., PUSCH occasions) based on uplink control information (UCI). For example, the UE 115-*a* may transmit, within a configured grant UCI or a different type of UCI (e.g., within a physical uplink control channel message (PUCCH)), an indication of skipped PUSCH occasions. The UE 115-*a* may also support multiple configured grant PUSCH transmission occasions in a period of a single configured grant PUSCH configuration. For example, the UE 115-*a* may perform prioritization between the sidelink interface 205 and the access link interface 210-*a* when resources overlap. In some cases, UE 115-*a* may adjust (e.g., lower) a power of transmissions and transmit both on sidelink (e.g., PC5) and uplink (e.g., Uu). In other cases, the UE 115-*a* may skip or cancel access link (e.g., Uu) or sidelink communications due to power limitation as well as prioritization of either of the interfaces.

In some examples, the UE 115-*a* may skip one or more communication occasions based on one or more measurement gaps. For example, the UE 115-*a* may be an example of a reduced capability (RedCap) UE, where a set of radio frequencies may be shared between the access link interface 210-*a* and the sidelink interface 205. The UE 115-*a* may perform radio resource management (RRM) on the access link interface 210-*a* using one or more measurement gaps. For example, during a measurement gap (e.g., configured via RRC or a configured grant), the UE 115-*a* may receive one or more signals from another UE 115, and based on measurements performed on the one or more signals and the access link interface 210-*a*, the UE 115-*a* may determine to perform a handover procedure to improve a connection. In one example, the UE 115-*a* may determine that an RSRP of a signal from the other network entity 105 is higher than an RSRP of the access link interface 210-*a*, and may perform handover to switch to a cell of the other network entity 105 to conserve power or improve communication reliability. However, a measurement gap for performing RRM may interfere or overlap with one or more communication occasions, where the UE 115-*a* may skip the one or more communication occasions based on a priority of the RRM procedures and measurement gap. Thus, measurement gaps may act be a bottleneck for UE 115-*a* communications as measurement gaps may interrupt data transmission and reception.

As such, the UE 115-*a* (or the UE 115-*b*) may support communications on both interfaces, including the sidelink interface 205 and the access link interface 210-*a* (or 210-*b*), and may support indicating one or more skipped communication occasions. In some examples, the UE 115-*a* may support indication of skipped communication occasions for a single component carrier in sidelink (e.g., for the sidelink interface 205) or a single component carrier in a Uu link (e.g., the access link interface 210-*a*). However, techniques may be desired for further defining the indication of the skipped resources to include more granular information. For example, while the UE 115-*a* may support indication of skipped occasions for a single component carrier on a Uu link or a sidelink, the UE 115-*a* may lack further definition and detail of various skipped resources within one or more indications among various groupings of information.

As described herein, a UE may support a variety of methods for indicating resource skipping across multiple interfaces. For example, the UE 115-*a* may support communications on both an access link interface (e.g., Uu interface), such as the access link interface 210-*a*, and a sidelink interface (e.g., PC5 interface), such as the sidelink interface 205. Within each interface, the UE 115-*a* may skip communication occasions of one or more component carriers, one or more sets of resources configured with separate configurations (e.g., resource pools in sidelink), and may support indicating various details of both interfaces to both the UE 115-*b* via the sidelink interface 205 and the network entity 105-*a* via the access link interface 210-*a*. In some examples, the UE may indicate skipped resources across both interfaces to improve resource utilization. For example, in Mode 1 random access, the network entity 105-*a* may utilize indications of skipped resources across both interfaces to reassign the skipped resources to other UEs 115 or PLCs (e.g., the UE 115-*b*). In some examples, the examples described herein may include the general case of multi-component carrier, multi-resource pool, and multi-interface skipping.

In an example, the UE 115-*a* may receive one or more configured grants 225 indicating one or more resources for the UE 115-*a* to use in communications. For example, the UE 115-*a* may receive a first configured grant 225-*a* indicating a first set of resources for use on the sidelink interface 205 as well as a second configured grant 225-*b* indicating a second set of resources for use on the access link interface 210-*a*. In some examples, the configured grants 225-*a* and 225-*b* may be examples of random access grants for Uu communications (e.g., of a Mode 1 random access procedure), sidelink communications or both. In some examples, the network entity 105-*a* may further configure the UE 115-*a* with a group of component carriers, a group of resource pools (or resources) within a component carrier or each component carrier of the group of component carriers, among other resources for each interface.

In some examples, the UE 115-*a* may apply power control and prioritization across the resources configured by the configured grants 225-*a* and 225-*b*. For example, the UE 115-*a* may allocate power for use in communications over each resource (e.g., in transmit occasions) within each component carrier of the sidelink interface 205 and within each component carrier of the access link interface 210-*a*, or across some or all component carriers of each interface. Additionally, or alternatively, the UE 115-*a* may allocate power for use in communications over a component carrier or across some or all component carriers across both interfaces (e.g., component carriers that are shared across the access link interface 210-*a* and the sidelink interface 205). In some examples, the UE 115-*a* may allocate power for component carriers as such for inter-band or intra-band component carrier aggregation. In some examples, the UE 115-*a* may also allocate power according to one or more resource groups (e.g., resource pools) of each interface or shared across both interfaces.

In some examples, after applying power control and prioritization, the UE 115-*a* may determine a list of skipped (e.g., partially or fully) resources or allocations in each interface. For example, the UE 115-*a* may determine to skip one or more communication occasions of the resources for use on the sidelink interface 205 configured by the first configured grant 225-*a*, to skip one or more communication occasions of the resources for use on the access link interface 210-*a*, or both. In some examples, the UE 115-*a* may determine to skip resources according to varying levels of granularity as described with respect to FIG. 3. For example, the UE 115-*a* may determine to skip communication occasions of an entire interface, such as the sidelink interface 205, or the access link interface 210-*a*. Additionally, or alternatively, the UE 115-*a* may determine to skip communication occasions of a single component carrier of one interface, all component carriers of an interface, or one or more component carriers across both interfaces. The UE 115-*a* may similarly skip one or more occasions of one or more resource groups of one or more component carriers or for each component carrier of each interface.

In some examples, the UE 115-*a* may determine to skip the one or more communication occasions based on various different events or parameters. For example, the UE 115-*a* may skip one or more communication occasions associated with the sidelink interface 205 or the access link interface 210-*a* based on a lack of data to transmit or receive (e.g., when little or no traffic is present). The UE 115-*a* may also skip (e.g., cancel or not use) one or more communication occasions when a packet delay has expired. For example, the UE 115-*a* may cancel communication occasions for available packets at the UE 115-*a* or packets that are supposed to use an allocation of resources (e.g., transmit occasions) if a packet delay for the packets has expired. Additionally, or alternatively, the UE may skip one or more communication occasions (e.g., cancel occasions associated with one or more transmissions) for both interfaces based on one or more measurements colliding with one or more communication occasions as described herein. For example, the UE 115-*a* may cancel one or more transmissions on both interfaces (e.g., when both interfaces share resources) based on an overlapping measurement gap for various measurements, such as RRM on the access link interface 210-*a* or CLI (e.g., cross link interference) measurements.

Additionally, or alternatively, the UE 115-*a* may determine to skip the one or more communication occasions based on a collision between resources of the sidelink interface 205 and the access link interface 210, where the UE 115-*a* may resolve the collision by cancelling at least one transmission scheduled on one of the interfaces. In some examples, the UE 115-*a* may cancel one or more transmissions over one or more occasions of the sidelink interface 205 based on a higher priority of one or more transmissions or receptions over the access link interface 210-*a*. The UE 115-*a* may also skip one or more communication occasions based on a power constraint, such as a maximum power limit. In some examples, the power constraint may be dynamic due to a change of available energy. For example, if the UE 115-*a* is an energy harvesting device, it may have a maximum power that is dynamic and changes based on available energy to be harvested.

In some examples, the UE 115-*a* may indicate the skipped communication occasions to one or more communication devices. For example, the UE 115-*a* may transmit one or more indications 230, where the one or more indications 230 may indicate the one or more communication occasions that are skipped. For example, the UE 115-*a* may transmit an indication 230-*a*, an indication 230-*b*, one or more additional indications 230, or any combination thereof to the network entity 105-*a* via the uplink communication link 220-*a* of the access link interface 210-*a* (e.g., Uu link/interface). Additionally, or alternatively, the UE 115-*a* may transmit the one or more indications 230 (including the indications 230-*a* and 230-*b*) to another UE, such as the UE 115-*b* via the sidelink interface 205. In some examples, the indications 230 may represent examples of UCI messages or sidelink messages accordingly. Additionally, or alternatively, an indication 230 may indicate one or more occasions that are to be used (e.g., not skipped).

In some examples, the UE 115-*a* may indicate the one or more skipped communication occasions according to various granularities of resource indications as described herein. For example, the UE 115-*a* may transmit the indication 230-*a* to indicate that the access link interface 210-*a* is skipped (e.g., communication occasions of the access link interface 210-*a* are skipped) or an indication 230-*b* to indicate that the sidelink interface 205 is skipped, or both. Additionally, or alternatively, the UE 115-*a* may transmit the indication 230-*a* to indicate that one or more component carriers of the access link interface 210-*a* are skipped and the indication 230-*b* to indicate that one or more component carriers of the sidelink interface 205 are skipped. The UE 115-*a* may similarly transmit separate indications to indicate one or more skipped resource groups of each component carrier of each interface, or to indicate one or more individual communication occasions of one or more resource groups/component carriers that are skipped in each interface. In some examples, the UE 115-*a* may transmit one or more indications 230 to indicate one or more component carriers, resource groups, or communication occasions shared between the access link interface 210-*a* and the sidelink interface 205 that are skipped. The UE 115-*a* may also transmit any combination of such indications. Additionally, or alternatively, the UE 115-*a* may transmit indications of one or more resources separately per reason for skipping. Thus, the UE 115-*a* may transmit the indications separately per interface, resource group, component carrier, or any combination thereof. In some examples, the UE 115-*a* may transmit one or more indexes within the indications 230 to indicate one or more interfaces, component carriers, resource pools, communication occasions, reasons, etc.

In some examples, the UE 115-*a* may transmit the one or more indications 230 using one or more bits. For example, the UE 115-*a* may transmit the indication 230-*a* including a bitmap, where '0' within the bitmap may indicate individual occasions that are skipped, and '1' may indicate individual occasions that are used. In some examples, additional bits may indicate one or more resource groups, component carriers, or interfaces associated with the skipped occasions (e.g., to identify the exact communication occasions that are skipped). Additionally, or alternatively, the one or more bits may indicate entire interfaces, entire component carriers, or entire resource groups of one or more component carriers, or any combination thereof to indicate a granularity skipped resources according to various granularities as described herein. Additionally, or alternatively, the UE 115-*a* may transmit the indication 230-*a* according to a codepoint, where a codepoint may include one or more singular indications that may each be mapped to a specific pattern of skipped occasions (e.g., a '1' may represent a bit sequence 1100 while a '2' may represent a bit sequence 1010). Additionally, or alternatively, the indication 230-*a* may be transmitted according to a codebook to map the one or more bits indicating one or more skipped occasions to one or more antenna ports for transmitting the indication 230-*a*. In some examples, the codebook may include one or more subcodebooks defining various groups for grouping indications of skipped occasions as described herein. For example, the indication 230-*a* may be transmitted according to a first subcodebook for indicating various component carriers that are skipped for each interface, whereas the indication 230-*b* may be transmitted according to a second subcodebook for indicating various resource groups of one or more component carriers that are skipped.

In some examples, the UE 115-*a* may group (e.g., bundle) the indications 230 according to each interface, component carrier, resource pool (e.g., resource group), or other factors (e.g., using component carriers or resource pools configured by network entity 105-*a* for bundling indications). For example, the UE 115-*a* may combine one or more indications 230 (e.g., the indication 230-*a* and the indication 230-*b*) of communication occasions that are skipped across both interfaces into a signal, or a single indication 230. For example, the UE 115-*a* may transmit the indication 230-*a* to indicate one or more component carriers that are skipped (e.g., of the access link interface 210-*a*), an interface that is skipped (e.g., the sidelink interface 205), and one or more individual resource groups or communication occasions that are skipped (e.g., of one or more component carriers of the access link interface 210-*a* that are not skipped). By way of another example, indications may be grouped according to different reasons for skipping. For example, the UE 115-*a* may transmit the indication 230-*a* to indicate one or more resources (e.g., communication occasions, resource pools, component carriers, or interfaces, or any combination thereof) that are skipped based on resource collisions, and may transmit the indication 230-*b* to indicate one or more resources that are skipped based on measurement gap overlap. The UE 115-*a* may additionally combine any of the aforementioned groupings together, for example, by transmitting an indication of skipped across one or more component carriers, resource groups per component carrier, interfaces, as well interfaces or other resources skipped based on one or more reasons.

In some examples, combining the indications may include multiplexing one or more indications 230 corresponding to one or more subcodebooks across a raw domain or bit domain by combining bits in a message. Additionally, or alternatively, the combining the indications may include multiplexing indications 230 of different subcodebooks in the time domain (e.g., transmitted at different time slots or over different symbols), in the frequency domain (e.g., transmitted using different frequencies), or in the spatial domain (e.g., transmitted using various antennas and beams/directions). For example, one or more resource elements or resource blocks may be assigned to a set of bits indicating one or more communication occasions skipped in the access link interface 210-*a* and one or more resource elements or blocks may be assigned to a set of bis indicating communication occasions skipped in the sidelink interface 205. In some examples, by grouping indications, the UE 115-*a* may reduce an amount of overhead in communications by reducing a quantity of transmitted indications 230.

In some examples, the UE 115-*a* may include, within the indications 230, one or more additional indications or information. For example, the UE 115-*a* may indicate associated reasons for skipping one or more indicated component carriers, resource groups, interfaces, etc. By indicating a reason for which one or more communication occasions are skipped, the network entity 105-*a* may adapt a periodicity of configured grants 225 or may configure additional configured grants for a same group of logic channels (LCG) as the previously to-be-configured resources (e.g., communication occasions) using a smaller periodicity. Additionally, or alternatively, the UE 115-*a* may include additional indications of one or more interfaces, component carriers or sets of component carriers, resource pools (e.g., groups) or sets of resources pools, or other groups associated with one or more individual communication occasions (e.g., to signal specific occasions that are skipped). Similarly, the UE 115-*a* may include indications of interfaces associated with indicated component carriers as well as interfaces and component carriers associated with indicated resource groups. In some examples, the UE 115-*a* may include an indication of a priority of the indication 230. In some examples, a priority of an indication 230 may be based on (e.g., inherited from and indicated or implicitly determined at the network entity 105-*a*) from a priority of underlying events. In an example, if data transmissions are skipped due to lack of traffic, a priority of the indication may be equal to that of the skipped transmissions or underlying data for the transmissions.

In some examples, the UE 115-*a* may transmit the indications 230 within a burst of signals (e.g., an information burst), such as a PUSCH burst or physical sidelink shared channel (PSSCH) burst including one or more PUSCH or PSCCH messages within a time duration. In some examples, the PUSCH or PSSCH bursts may represent bursts of traffic transmitted during one or more extended reality (XR) applications for the access link interface 210-*a* and the sidelink interface 210. For example, the wireless communication system 200 may be an example of an XR system, where the UE 115-*a*, the UE 115-*b*, or both may be XR devices transmitting information for XR applications.

In some examples, the UE 115-*a* may transmit an indication of a capability of the UE 115-*a* to transmit the indications 230 of the one or more skipped communication occasions. For example, the UE 115-*a* may transmit a capability indication 235 before receiving the configured grants 225 and transmitting the one or more indications 230. In some examples, the capability indication 235 may be an example of a general capability message of the UE 115-*a* transmitted in UCI, or may be a separate capability indication for indicating capability to transmit the indications 230. In some examples, the UE 115-*a* may transmit the capability indication 235 with in a layer 1 (L1), layer 2 (L2), layer 3 (L3), or upper (e.g., higher) layer message.

In some examples, the capability indication 235 may indicate that the UE 115-*a* is capable of skipping the one or more communication occasions according to the various events as described herein (e.g., collisions, priority, power management, one or more measurements, or lack of traffic). Additionally, or alternatively, the UE 115-*a* may indicate, within the capability indication 235, that the UE 115-*a* is capable of indicating the one or more skipped occasions during such events, or that the UE 115-*a* is capable of indicating, within the indications 230, one or more reasons or events for which the one or more communication occasions were skipped. In some examples, indicating that the UE 115-*a* is capable of transmitting the one or more indications 230 may allow the network entity 105-*a* to adapt one or more signals (e.g., the configured grants 225) and parameters in anticipation of receiving feedback from the UE 115-*a*.

In some examples, the network entity 105-*a* may configure the UE 115-*a* (or the UE 115-*b*) with one or more resources for transmitting at least one of the one or more indications 230. For example, the network entity 105-*a* may transmit a control signal 240 before the configured grants 225, where the control signal 240 may be an example of RRC message, or DCI. The control signal 240 may indicate one or more common or separate resources that are grouped according to interface, component carriers, resources groups, etc. as described herein for grouping indications. In some cases, one or more resources may be defined for separately indicating skipped resources according to component carriers. For example, a single resource may be used for transmitting an indication 230-*a* corresponding to a first component carrier on which occasions are skipped and a second resource may be used for transmitting an indication 230-*b* corresponding to a second component carrier on which occasions are skipped, where the UE 115-*a* may transmit both indications within a same time period or frequency depending on the indicated resources. Additionally, or alternatively, an associated timeline and resources for transmitting indications may be different for one or more reasons for skipping based on groupings according to skipping reasons as described herein.

Additionally, or alternatively, the resources may indicate a single resource or set of resources on which a joint indication may be transmitted. For example, a single resource or a set of resources may be configured for transmitting a multiplexed indication 230 including indications of one or more component carriers, resource pools, individual communication occasions, interfaces (e.g., indicated via an interface indicator), events grouping one or more resources, or any combination thereof as described herein. For example, a same set of common resources may be used to transmit skipping across a group (e.g., bundle) of component carriers, across different resources (e.g., communication occasions) or resource pools per component carrier, and of different interfaces for different reasons of skipping. In some examples, the resources may also be configured so the UE 115-*a* may indicate a priority of an indication 230-*a* among other indications. In some examples, the control signal 240 may define one or more common resources for multiplexing one or more subcodebooks as described herein.

In some examples, the network entity 105-*a* may configure a list of possible resources via the control signal 240, and the UE 115-*a* may select one or more resources for transmitting indications 230 based on a type of skipping or interface, one or more component carriers or component carrier groups, or one or more resource groups (e.g., resource pools defined by resource pool indexes). For example, the UE 115-*a* may select resources for transmitting the indications 230 according to different grouping configurations as described herein.

In some examples, the UE 115-*b* may function as a relay UE for the UE 115-*a*. For example, the UE 115-*b* may be an example of a PLC and may be selected (e.g., may receive a control message from the network entity 105-*a*) for gathering or collecting information. In an example, the UE 115-*a* may transmit one or more indications 230 (e.g., an indication 230-*a*, 230-*b*, or both) to the UE 115-*b* via the sidelink interface 205, and the UE 115-*b* may transmit the one or more indications 230 to the network entity 105-*a* via an access link interface 210-*b*. The UE 115-*b* may additionally gather and transmit similar indications 230 from one or more additional UEs 115. In some examples, the UE 115-*b* may also determine to skip one or more resources and may signal the skipped resources using various resources or groupings. For example, the UE 115-*b* may receive a configured grant 225-*c* and a configured grant 225-*d* from the network entity 105-*a* via a downlink communication link 215-*b* of an access link interface 210-*b*, the configured grants 225 indicating resources for the sidelink interface 205 and the access link interface 210-*b*. The UE 115-*b* may determine one or more communication occasions of the configured resources to skip based on one or more events or groupings, and may transmit one or more indications 230 to indicate the one or more skipped communication occasions (e.g., to the network entity 105-*a* via an uplink communication link 220-*b* of the access link interface 210-*b*). In some examples, the UE 115-*b* may multiplex the indications of its own skipped occasions with the received indications 230 from the UE 115-*a* (and other UEs 115), and may transmit the indications together in a single signal. For example, in inter-UE coordination messages in sidelink, the UE 115-*b* may modify the indication 230-*a* to be relayed from the UE 115-*a* based on at least skipped resources/occasions at the UE 115-*b* as well as collected skipped occasions from other UEs 115. Additionally, or alternatively, the UE 115-*b* may modify or transmit indications 230 according to one or more codebooks, may relay a capability indication such as the capability indication 235, or may transmit another capability indication 235 indicating a capability of the UE 115-*b* to relay or transmit indications 230. The UE 115-*b* may also relay additional messages to the UE 115-*a*, including the control signal 240 and the configured grants 225-*a* and 225-*b*.

In some examples, the UE 115-*a* may transmit an indication 245 of whether or not the UE 115-*a* will transmit one or more uplink messages based on an overlap with one or more or measurement gaps. For example, the UE 115-*a* may determine whether or not the give a measurement gap (e.g., for RRM or CLI) a priority over one or more uplink transmissions, such as PUSCH transmissions (e.g., for one or more communication occasions) when the measurement gap overlaps the transmissions. The UE 115-*a*, based on the determination, may transmit a measurement indication 245 to the network entity 105-*a* (either directly or relayed through the UE 115-*b*). In some examples, the network entity 105-*a* and the UE 115-*a* may agree on a default behavior, where the default behavior (e.g., received in the control signal 240) may define that if a PUSCH transmission (or set of PUSCH transmissions in a time duration) is skipped when colliding with measurement gap, the UE 115-*a* may refrain from transmitting the measurement indication 245 (where the PUSCH being skipped it assumed by the network entity 105-*a*). Otherwise, if the UE 115-*a* determines to skip the measurement gap, the default behavior may define that the UE 115-*a* is to transmit the measurement indication 245. In some examples, the measurement indication 245 may indicate that the UE 115-*a* will transmit the PUSCH transmission and will skip the measurement gap. In some cases, the UE 115-*a* may transmit the measurement indication 245 regardless to either indicate that the UE 115-*a* will transmit the PUSCH transmission and skip the measurement gap, or that the UE 115-*a* will skip the PUSCH transmission and perform measurements during the measurement gap. In some examples, the indication 245 may be a negative or positive indication of using or skipping the PUSCH or the measurement gap. In some cases, the UE 115-*a* may determine to skip or perform one or more measurements of a measurement gap based on a priority (e.g., defined in the default behavior as higher priority to the measurement gap or PUSCH transmissions).

In some examples, the measurement indication 245 may enable the network entity 105-*a* to skip one or more transmissions. For example, if the UE 115-*a* determines to skip one or more measurements (e.g., in green communications) and indicates so in the measurement indication 245, the network entity 105-*a* may refrain from transmission of one or more signals for the measurements, such as synchronization signal blocks (SSBs), which may reduce an amount of transmissions and conserve resources for use in other communications. In some cases, the network entity 105-*a* may share the measurement indication 245 with one or more other network entities (e.g., via an Xn or X2 interface).

Figure 3:
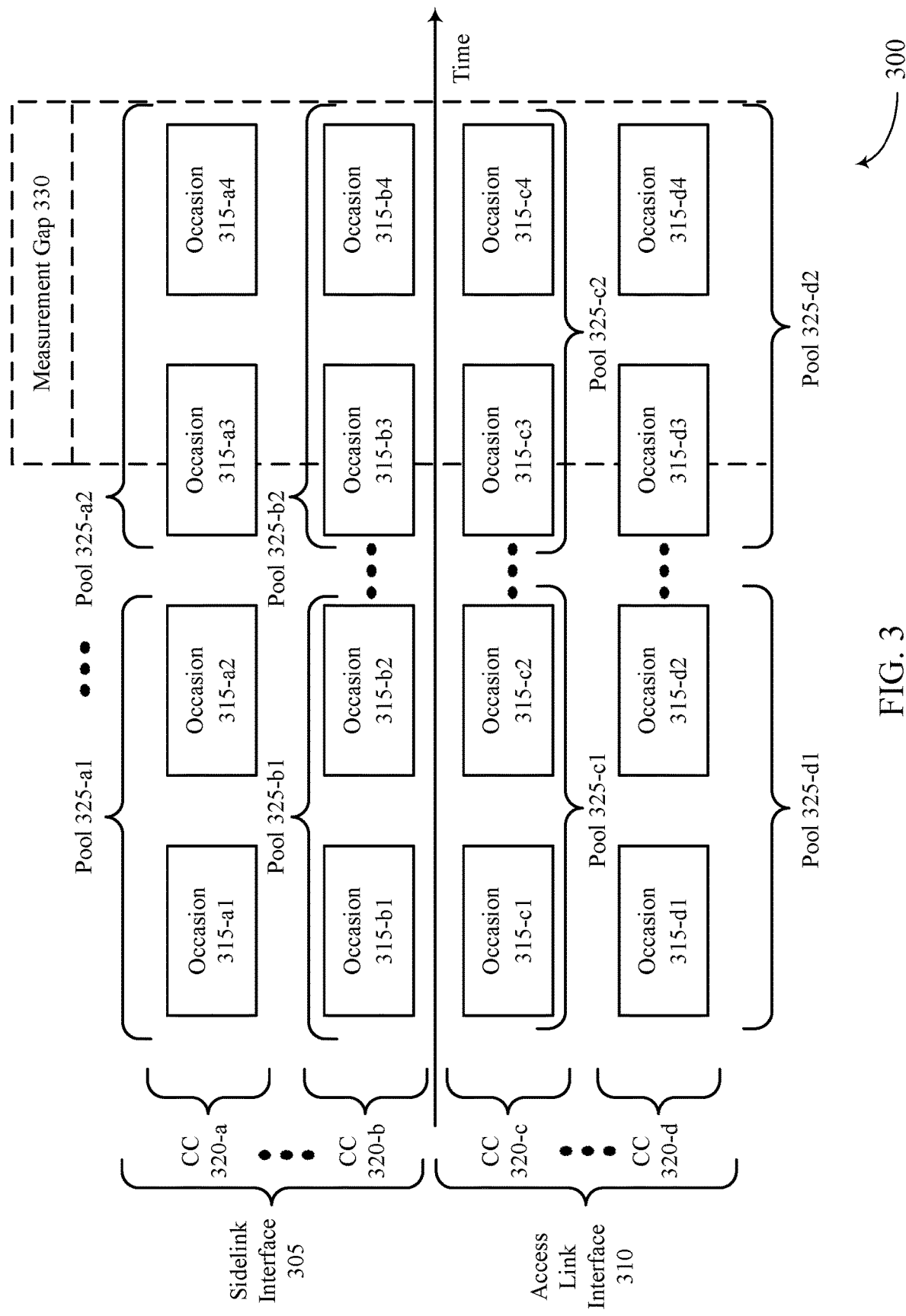
FIG. 3 shows an example of a resource grouping diagram that supports multiple interface resource skipping in accordance with one or more aspects of the present disclosure.

FIG. 3 shows an example of a resource grouping diagram 300 that supports multiple interface resource skipping in accordance with one or more aspects of the present disclosure. The resource grouping diagram 300 may illustrate an example for implementing one or more aspects of the wireless communications systems 100 and 200. For example, the resource grouping diagram 300 may represent various resources configured at the UE 115-*a*, the UE 115-*b*, or both, by the network entity 105-*a* described with respect to FIG. 2. In some examples, FIG. 3 may be an example of different groupings for indicating one or more communication occasions that are skipped at the UE 115-*a* according to an access link interface 310 and a sidelink interface 305, which may represent the access link interface 210-*a* or 210-*b* and the sidelink interface 205, respectively.

For example, the network entity 105-*a* may transmit one or more configured grants 225 to the UE 115-*a* (or the UE 115-*b*) to configure a first set of resources for the sidelink interface 305 and a second set of resources for the access link interface 310. Each set of resources may include one or more communication occasions 315, which may each represent a scheduled resource (e.g., a time slot occasion, frequency, or other resource) for receiving or transmitting one or more transmissions. For example, the first set of resources corresponding to the sidelink interface 305 may include communication occasions 315-*a*1 through 315-*a*4 up to communication occasions 315-*b*1 through 315-*b*4 across a set of time resources (e.g., across the time domain). Similarly, the second set of resources corresponding to the access link interface 310 may include communication occasions 315-*c*1 through 315-*c*4 up to communication occasions 315-*d*1 through 315-*d*4. In some examples, the network entity 105-*a* may configure any quantity of communication occasions.

In some examples, the interfaces may each include one or more component carriers including one or more of the configured communication occasions 315. For example, the sidelink interface 305 may include component carriers 320-*a* through 320-*b* and the access link interface 310 may include component carriers 320-*c* through 320-*d*. The component carriers 320-*a*, 320-*b*, 320-*c*, and 320-*d* may thus include the communication occasions 315-*a*, 315-*b*, 315-*c*, and 315-*d*, respectively. Additionally, or alternatively, the interfaces may each include one or more resource pools 325, where each resource pool 325 may be a grouping of one or more communication occasions 315 of the component carriers 320. For example, the sidelink interface 305 may include resource pools 325-*a*1 through 325-*a*2 up to resource pools 325-*b*1 through 325-*b*2, and the access link interface 310 may include resource pools 325-*c*1 through 325-*c*2 up to pools 325-*d*1 through 325-*d*2.

In some examples, the first and second sets of resources shown in the resource grouping diagram 300 may represent grouping indications as described with respect to FIG. 2. For example, the UE 115-*a* may transmit an indication according to various combinations of component carriers, resource pools, and interfaces. In one example, the UE 115-*a* may transmit an indication that one or more component carriers of one interface are skipped. For example, the UE 115-*a* may transmit an indication that the component carrier 320-*a* of the sidelink interface 305 is skipped after determining to skip the communication occasions 315-*a*1 through 315-*a*4. Additionally, or alternatively, the UE 115-*a* may transmit an indication that one or more resource pools 325 of one interface are skipped. For example, the UE 115-*a* may transmit an indication that the resource pools 325-*a*2 and 325-*b*2 of the sidelink interface 305 are skipped based on determining to skip the occasions 315-*a*3, 315-*a*4, 315-*b*3, and 315-*b*4. Additionally, or alternatively, the UE 115-*a* may transmit the indications based on determining to skip specific component carriers 320 or resource pools 325.

In some examples, the UE 115-*a* may transmit an indication that one or more component carriers or resource groups across one or more interfaces are skipped. For example, the UE 115-*a* may transmit an indication that the component carriers 320-*a* and 320-*c* are skipped after determining to skip the communication occasions 315-*a*1 through 315-*a*4 and 315-*c*1 through 315-*c*4. In some examples, the component carriers 320-*a* and 320-*c* may represent a same component carrier with a same set of communication occasions 315 that are shared across the sidelink interface 305 and the access link interface 310. By way of another example, the UE 115-*a* my transmit an indication that the resource pools 325-*a*1 and 325-*c*1 are skipped. In some examples, the resource pools 325-*a*1 and 325-*c*1 may be examples of same resource groups of same sets of communication occasions shared across the two interfaces. Additionally, or alternatively, the UE 115-*a* may transmit an indication of one or more individual communication occasions 315 that are skipped. The UE 115-*a* may also indicate an interface that is skipped. For example, the UE 115-*a* may indicate that the sidelink interface 305 is skipped based on determining to skip each communication occasion 315 of the sidelink interface 305. In some examples, the UE 115-*a* may transmit one or more indications of any combination of interfaces, communication occasions 315, component carriers 320, and resource pools 325.

The first and second sets of resources may also represent resource groupings configured for a set of resources for transmitting indications, where the set of resources is either configured by the network entity 105-*a* or selected by the UE 115-*a* as described with respect to FIG. 2. For example, the UE 115-*a* may be configured with (or select) different resources for transmitting indications, where the resources may correspond to indications of any combination of the communication occasions 315, the component carriers 320, and the resource pools 325 for the sidelink interface 305 and the access link interface 310. The resources may also include one or more common resources for transmitting any combination of the groupings displayed in FIG. 2. In some examples, the indications, the resources for transmitting the indications, or both, may be based on one or more events, priorities, or other circumstances as described with respect to FIG. 2. In some cases, the UE 115-*a* may multiplex one or more indications within one or more common resources.

In some examples, the UE 115-*a* may determine to skip one or more resources, including one or more communication occasions 315, one or more component carriers 320, one or more resource pools 325 of one or more component carriers, or one or more interfaces, based on one or more events or circumstances as described with respect to FIG. 2. For example, the UE 115-*a* my determine to skip one or more communication occasions 315 based on one or more measurements performed, for example, on the access link interface 310 as described with respect to FIG. 2. In an example, the UE 115-*a* may be configured (e.g., by RRC transmitted by the network entity 105-*a*) with a measurement gap 330 for performing one or more RRM measurements on the access link interface 310, or for performing one or more CLI measurements. The measurement gap 330 may collide or overlap at least partially with one or more communication occasions 315. For example, the measurement gap 330 may overlap in the time domain with the communication occasions 315-*a*3, 315-*a*4, 315-*b*3, 315-*b*4, 315-*c*3, 315-*c*4, 315-*d*3, and 315-*d*4. Based on this overlap, the UE 115-*a* may determine to skip the overlapped communication occasions. Additionally, or alternatively, the UE 115-*a* may determine to skip one or more overlapped pools based on each communication occasion 315 of each pool being skipped. For example, the UE 115-*a* may determine to skip the resource pools 325-*a*2, 325-*b*2, 325-*c*2, and 325-*d*2.

Figure 4:
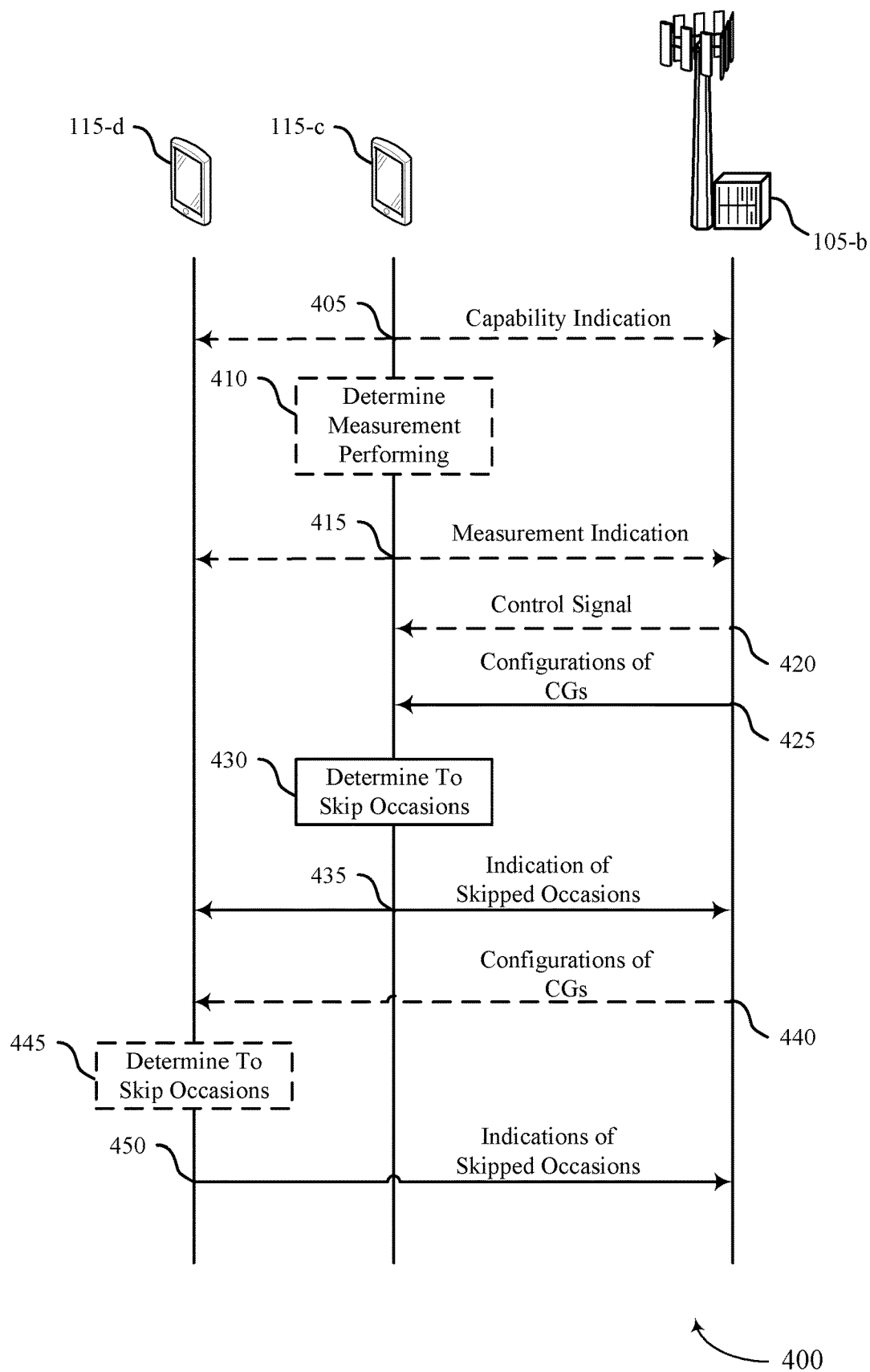
FIG. 4 shows an example of a process flow that supports multiple interface resource skipping in accordance with one or more aspects of the present disclosure.

FIG. 4 shows an example of a process flow 400 that supports multiple interface resource skipping in accordance with one or more aspects of the present disclosure. In some examples, the process flow 400 may implement aspects of the wireless communications systems 100 and 200 and the resource grouping diagram 300. For example, the process flow 400 may illustrate an example of a network entity 105-*b* in communication with a UE 115-*c* and a UE 115-*d* using one or more access link interfaces, where the UEs 115-*c* and 115-*d* may be in communication using a sidelink interface. In some examples, the process flow 400 may demonstrate various methods of indicating resource skipping across multiple interfaces according to various groupings as described herein.

Alternative examples of the following may be implemented, where some processes are performed in a different order than described or are not performed. In some cases, processes may include additional features not mentioned below, or further processes may be added.

At 405, the UE 115-*c* may optionally transmit, to a communication device (e.g., the network entity 105-*b* or the UE 115-*d*), an indication of a capability of the UE 115-*c* to transmit indications of one or more communication occasions. For example, the UE 115-*c* may transmit the indication of the capability (or the UE 115-*d* may relay the indication) to the network entity 105-*b*.

In some examples, the indication of the capability may indicate a capability of the UE 115-*c* to indicate that one or more communication occasions are skipped based on a collision associated with one or more resources of a first set of resources, a second set of resources, or a third set of resources. Additionally, or alternatively, the indication of the capability may indicate a capability of the UE 115-*c* to indicate that one or more communication occasions are skipped based on one or more measurements performed on an access communication link, on a quantity of communications at the UE, on an expiration of a packet delay, or on any combination thereof.

At 410, the UE 115-*c* may optionally determine that one or more resources of the first set of resources, the second set of resources, or both, collide with a measurement gap, and may determine whether to perform one or more measurements during the measurement gap based on the collision.

At 415, the UE 115-*c* may optionally transmit, to the communication device (e.g., the network entity 105-*b* or the UE 115-*d*) an indication of whether the one or more measurements are performed based at least in part on determining whether to perform the one or more measurements At 420, the UE 115-*c* may optionally receive, and the network entity 105-*b* may optionally transmit, a control signal indicating the third set of resources for transmitting an indication of one or more communication occasions that are skipped, where the indication may be transmitted/received using one or more resources of the third set of resources based on the control signal.

At 425, the network entity 105-*b* may transmit, and the UE 115-*c* may receive, a first configuration of a first configured grant indicating the first set of resources for performing communications using a first interface that includes a sidelink communication link between the UE 115-*c* and the UE 115-*d*. The network entity 105-*b* may also transmit, and the UE 115-*c* may receive, a second configuration of a second configured grant indicating the second set of resources for performing communications using a second interface that includes an access communication link between the UE 115-*c* and the network entity 105-*b*.

In some examples, the first configured grant may indicate a set of multiple first PUSCH transmission occasions of the first set of resources and the second configured grant may indicate a set of multiple second PUSCH transmission occasions of the second set of resources. In some examples, the set of multiple first PUSCH transmission occasions, the set of multiple second PUSCH transmission occasions, or both, may include the one or more communication occasions that are skipped. In some examples, the first configured grant and the second configured grant may be transmitted based on the capability indication.

At 430, the UE 115-*c* may determine to skip one or more communication occasions of the first set of resources of the first interface, the second set of resources of the second interface, or both.

For example, determining to skip the one or more communication occasions may include determining to skip one or more first communication occasions of the first set of resources of the first interface and one or more second communication occasions of the second set of resources of the second interface. In some examples, the indication may be a joint indication of the one or more first communication occasions and the one or more second communication occasions, the one or more communication occasions including the one or more first communication occasions and the one or more second communication occasions.

In some examples, determining to skip the one or more communication occasions may include detecting one or more events. For example, the one or more events may include a collision associated with one or more resources of the first set of resources, the second set of resources, or the third set of resources, one or more measurements performed on the access communication link, a quantity of communications at the UE 115-*c* waiting to be transmitted using the first interface or the second interface, an expiration of a packet delay, or any combination thereof. In some cases, the indication of the one or more communication occasions may indicate that the one or more communication occasions were skipped based on the one or more events.

At 435, the UE 115-*c* may transmit, to a communication device (e.g., the network entity 105-*b* or the UE 115-*d*), an indication of the one or more communication occasions of the first interface and the second interface that are skipped based on determining to skip the one or more communication occasions. In some examples, the indication of the one or more communication occasions may be transmitted based on the first configured grant and the second configured grant. In some examples, the indication may include one or more bitmaps, one or more codepoints within a sidelink shared channel, or both.

In some examples, transmitting the indication may further include transmitting an indication of one or more component carriers of the first set of resources of the first interface, one or more component carriers of the second set of resources of the second interface, or both. In some cases, the one or more component carriers may include the one or more communication occasions of the first set of resources and the second set of resources that are skipped. In some examples, transmitting the indication may further include transmitting an indication of one or more resource pools of each of the one or more component carriers of the first set of resources and the second set of resources, where the one or more resource pools may include the one or more communication occasions of the first interface and the second interface.

In some examples, the UE 115-*c* may determine one or more codebooks mapping the one or more communication occasions with one or more component carriers of the first set of resources and the second set of resources and with one or more resource pools of each of the one or more component carriers, where the indication of the one or more communication occasions may be transmitted according to the one or more codebooks. In some examples, transmitting the indication in accordance with the one or more codebooks may include multiplexing the one or more codebooks in a bit domain, in a time domain, in a frequency domain, or any combination thereof.

In some examples, the third set of resources may include one or more common resources, where transmitting the indication of the one or more communication occasions may include transmitting an indication of the one or more communication occasions with an indication of the first interface and the second interface, an indication of one or more component carriers of the first set of resources and the second set of resources and including the one or more communication occasions, and an indication of one or more resource pools corresponding to each of the one or more component carriers of the first set of resources and the second set of resources.

In some examples, the third set of resources may include a first subset of the third set of resources and a second subset of the third set of resources, where transmitting the indication of the one or more communication occasions may include transmitting, using the first subset of the third set of resources, an indication of one or more first communication occasions of the first set of resources of the first interface that are skipped, an indication of one or more first component carriers of the first set of resources and including the one or more first communication occasions, of one or more first resource pools corresponding to each of the one or more first component carriers, or any combination thereof. Transmitting the indication of the one or more communication occasions may also include transmitting, using the second subset of the third set of resources, an indication of one or more second communication occasions of the second set of resources of the second interface that are skipped, of one or more second component carriers of the second set of resources and including the one or more second communication occasions, of one or more second resource pools corresponding to each of the one or more second component carriers, or any combination thereof.

In some examples, the UE 115-*c* may select one or more resources of the third set of resources based on the first interface and the second interface, one or more component carriers associated with the first set of resources of the first interface and the second set of resources of the second interface, and one or more resource pools associated with each of the one or more component carriers. In some cases, the indication of the one or more communication occasions may be transmitted using the selected one or more resources of the third set of resources.

In some examples, the indication of the one or more communication occasions may be transmitted to the UE 115-*d* via the sidelink communication link using one or more resources of the first set of resources or of the third set of resources. In some cases, the indication may be associated with another indication transmitted by the UE 115-*d* to the network entity at 450, wherein the second indication may be based on one or more indications transmitted by one or more UEs, the one or more indications including at least the indication transmitted by the UE. In such an example, the UE 115-*c* may represent a transmitting UE, and the UE 115-*d* may represent a receiving UE.

In some examples, the indication of the one or more communication occasions may be transmitted to the network entity 105-*b* via the access communication link using one or more resources of the second set of resources or of the third set of resources.

At 440, the UE 115-*d* may optionally receive additional configured grants indicating an additional set of resources for performing communications using the first interface and indicating an additional set of resources for performing communications using a third interface, where the third interface may include an access communication link between the UE 115-*d* and the network entity 105-*b*.

At 445, the UE 115-*d* may optionally determine to skip one or more second communication occasions of the additional set of resources of the first interface, the additional set of resources of the third interface, or both.

At 450, the UE 115-*d* may optionally transmit, to the network entity 105-*b*, another indication (e.g., a retransmission of the indication) of the one or more communication occasions of the first interface and the second interface that are skipped based on receiving the indication. In some examples, the UE 115-*d* may transmit, to the network entity 105-*b*, an additional indication of the determined one or more second communication occasions of the first interface and the third interface that are skipped based on determining to skip the one or more second communication occasions. In some examples, the UE 115-*d* may transmit the other indication of the one or more communication occasions and the additional indication of the one or more second communication occasions using one or more common resources of another set of resources (e.g., the third set of resources). In some examples, the other indication of the one or more communication occasions is transmitted using a first subset of the other set of resources and the additional indication of the one or more second communication occasions is transmitted using a second subset of the other set of resources.

In some examples, the UE 115-*d* may receive, from one or more additional UEs 115 (e.g., one or more second transmitting UEs), one or more indications of one or more third communication occasions that are skipped, and may transmit one or more further indications of the one or more third communication occasions that are skipped based on receiving the one or more indications from the one or more additional UEs 115. In some examples, the other indication of the one or more communication occasions and the further indications of the one or more third communication occasions may be transmitted using one or more common resources of the third set of resources.

Figure 5:
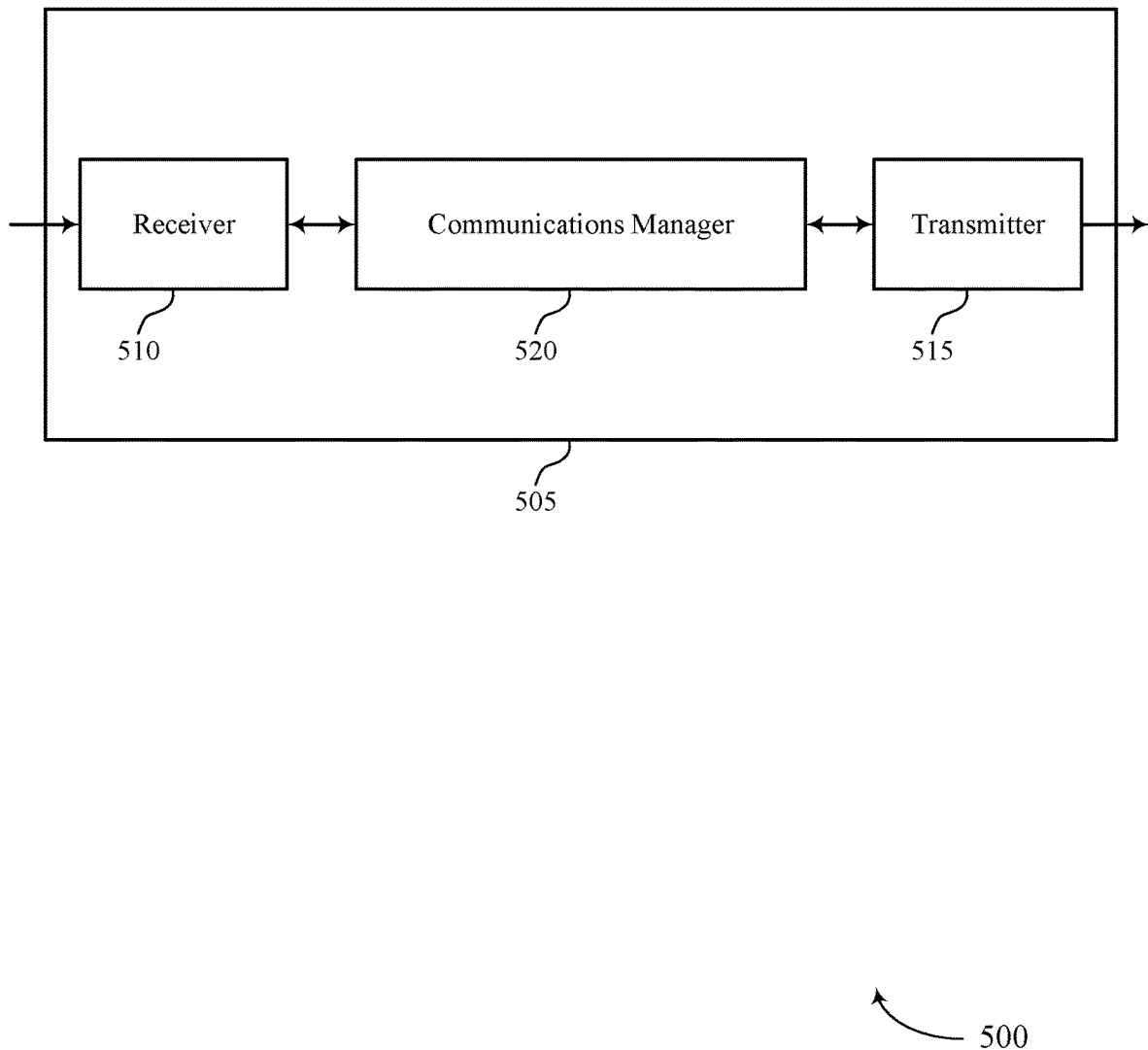
FIGS. 5 and 6 show block diagrams of devices that support multiple interface resource skipping in accordance with one or more aspects of the present disclosure.

FIG. 5 shows a block diagram 500 of a device 505 that supports multiple interface resource skipping in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multiple interface resource skipping). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multiple interface resource skipping). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multiple interface resource skipping as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 is capable of, configured to, or operable to support a means for receiving a first configuration of a first configured grant indicating a first set of resources for performing communications using a first interface that includes a sidelink communication link between the UE and a second UE. The communications manager 520 is capable of, configured to, or operable to support a means for receiving a second configuration of a second configured grant indicating a second set of resources for performing communications using a second interface that includes an access communication link between the UE and a network entity. The communications manager 520 is capable of, configured to, or operable to support a means for determining to skip one or more communication occasions of the first set of resources of the first interface, the second set of resources of the second interface, or both. The communications manager 520 is capable of, configured to, or operable to support a means for transmitting, to a communication device, an indication of the one or more communication occasions of the first interface and the second interface that are skipped based on determining to skip the one or more communication occasions.

Additionally, or alternatively, the communications manager 520 may support wireless communications at a receiving UE in accordance with examples as disclosed herein. For example, the communications manager 520 is capable of, configured to, or operable to support a means for receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity. The communications manager 520 is capable of, configured to, or operable to support a means for transmitting, to the network entity, a second indication of the one or more communication occasions of the first interface and the second interface that are skipped based on receiving the indication.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources by using various groupings of resources and indications, reduced power consumption, and improved coordination between devices.

Figure 6:
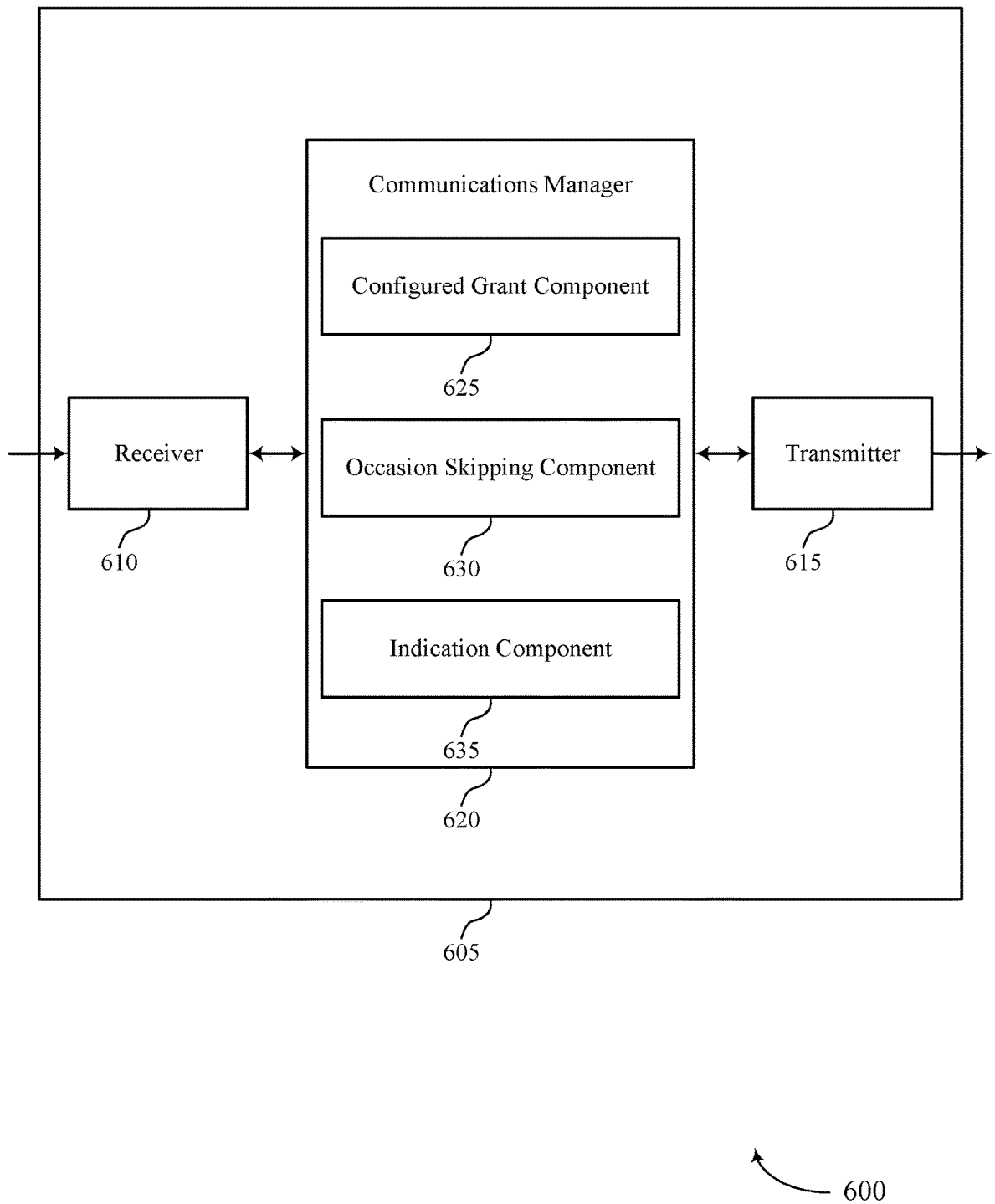

FIG. 6 shows a block diagram 600 of a device 605 that supports multiple interface resource skipping in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multiple interface resource skipping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multiple interface resource skipping). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multiple interface resource skipping as described herein. For example, the communications manager 620 may include a configured grant component 625, an occasion skipping component 630, an indication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The configured grant component 625 is capable of, configured to, or operable to support a means for receiving a first configuration of a first configured grant indicating a first set of resources for performing communications using a first interface that includes a sidelink communication link between the UE and a second UE. The configured grant component 625 is capable of, configured to, or operable to support a means for receiving a second configuration of a second configured grant indicating a second set of resources for performing communications using a second interface that includes an access communication link between the UE and a network entity. The occasion skipping component 630 is capable of, configured to, or operable to support a means for determining to skip one or more communication occasions of the first set of resources of the first interface, the second set of resources of the second interface, or both. The indication component 635 is capable of, configured to, or operable to support a means for transmitting, to a communication device, an indication of the one or more communication occasions of the first interface and the second interface that are skipped based on determining to skip the one or more communication occasions.

Additionally, or alternatively, the communications manager 620 may support wireless communications at a receiving UE in accordance with examples as disclosed herein. The indication component 635 is capable of, configured to, or operable to support a means for receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity. The indication component 635 is capable of, configured to, or operable to support a means for transmitting, to the network entity, a second indication of the one or more communication occasions of the first interface and the second interface that are skipped based on receiving the indication.

Figure 7:
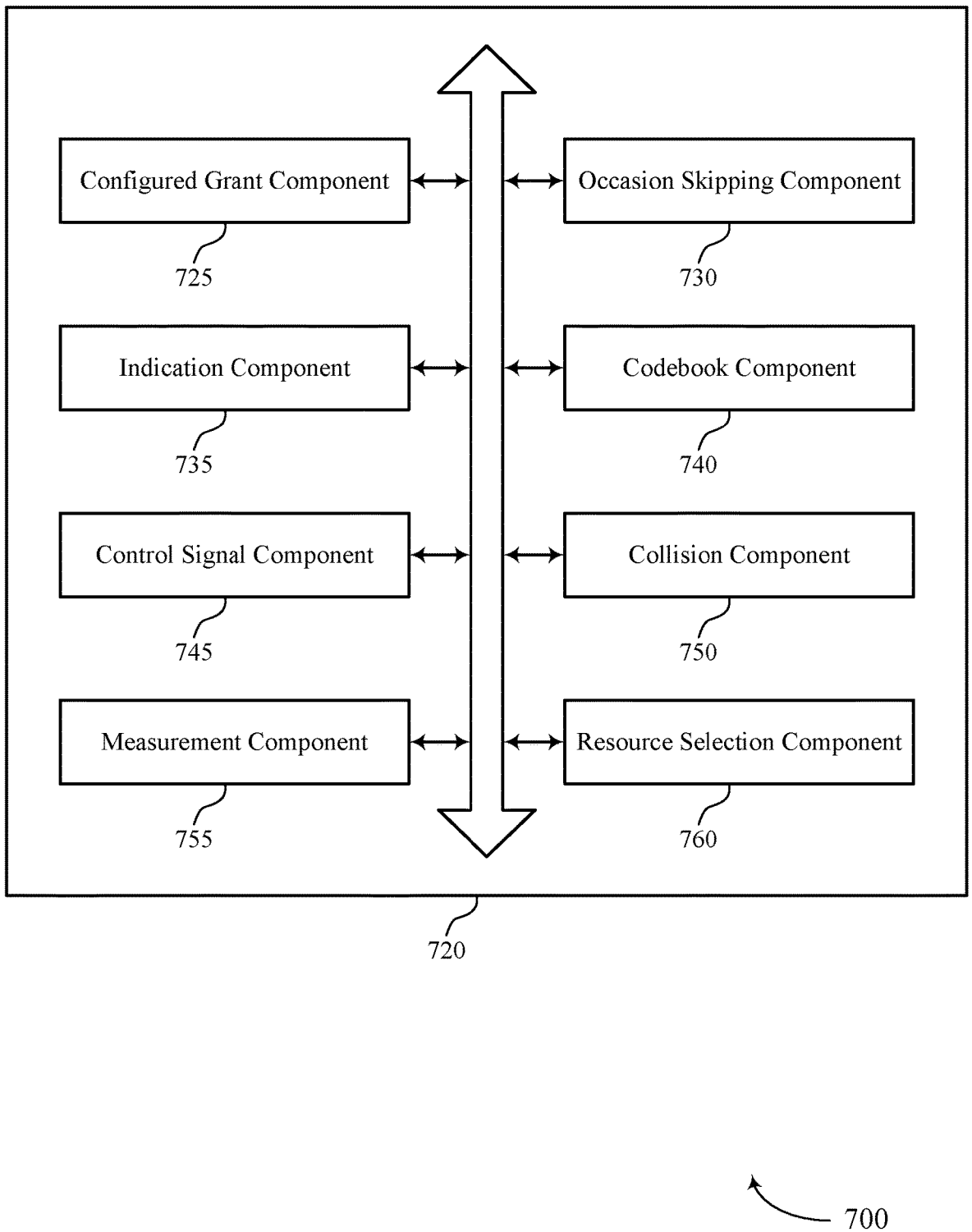
FIG. 7 shows a block diagram of a communications manager that supports multiple interface resource skipping in accordance with one or more aspects of the present disclosure.

FIG. 7 shows a block diagram 700 of a communications manager 720 that supports multiple interface resource skipping in accordance with one or more aspects of the present disclosure. The communications manager 720 may be an example of aspects of a communications manager 520, a communications manager 620, or both, as described herein. The communications manager 720, or various components thereof, may be an example of means for performing various aspects of multiple interface resource skipping as described herein. For example, the communications manager 720 may include a configured grant component 725, an occasion skipping component 730, an indication component 735, a codebook component 740, a control signal component 745, a collision component 750, a measurement component 755, a resource selection component 760, or any combination thereof. Each of these components may communicate, directly or indirectly, with one another (e.g., via one or more buses).

The communications manager 720 may support wireless communications at a UE in accordance with examples as disclosed herein. The configured grant component 725 is capable of, configured to, or operable to support a means for receiving a first configuration of a first configured grant indicating a first set of resources for performing communications using a first interface that includes a sidelink communication link between the UE and a second UE. In some examples, the configured grant component 725 is capable of, configured to, or operable to support a means for receiving a second configuration of a second configured grant indicating a second set of resources for performing communications using a second interface that includes an access communication link between the UE and a network entity. The occasion skipping component 730 is capable of, configured to, or operable to support a means for determining to skip one or more communication occasions of the first set of resources of the first interface, the second set of resources of the second interface, or both. The indication component 735 is capable of, configured to, or operable to support a means for transmitting, to a communication device, an indication of the one or more communication occasions of the first interface and the second interface that are skipped based on determining to skip the one or more communication occasions.

In some examples, to support determining to skip the one or more communication occasions, the occasion skipping component 730 is capable of, configured to, or operable to support a means for determining to skip one or more first communication occasions of the first set of resources of the first interface and one or more second communication occasions of the second set of resources of the second interface, where the indication includes a joint indication of the one or more first communication occasions and the one or more second communication occasions, the one or more communication occasions including the one or more first communication occasions and the one or more second communication occasions.

In some examples, to support transmitting the indication, the indication component 735 is capable of, configured to, or operable to support a means for transmitting an indication of one or more component carriers of the first set of resources of the first interface, one or more component carriers of the second set of resources of the second interface, or both, where the one or more component carriers include the one or more communication occasions of the first set of resources and the second set of resources that are skipped.

In some examples, to support transmitting the indication, the indication component 735 is capable of, configured to, or operable to support a means for transmitting an indication of one or more resource pools of each of the one or more component carriers of the first set of resources and the second set of resources, where the one or more resource pools include the one or more communication occasions of the first interface and the second interface.

In some examples, the codebook component 740 is capable of, configured to, or operable to support a means for determining one or more codebooks mapping the one or more communication occasions with one or more component carriers of the first set of resources and the second set of resources and with one or more resource pools of each of the one or more component carriers, where the indication of the one or more communication occasions is transmitted according to the one or more codebooks.

In some examples, transmitting the indication in accordance with the one or more codebooks includes multiplexing the one or more codebooks in a bit domain, in a time domain, in a frequency domain, or any combination thereof.

In some examples, the control signal component 745 is capable of, configured to, or operable to support a means for receiving a control signal indicating a third set of resources for transmitting the indication of the one or more communication occasions.

In some examples, where the third set of resources includes one or more common resources, to support transmitting the indication of the one or more communication occasions, the indication component 735 is capable of, configured to, or operable to support a means for transmitting an indication of the one or more communication occasions with an indication of the first interface and the second interface, an indication of one or more component carriers of the first set of resources and the second set of resources and including the one or more communication occasions, and an indication of one or more resource pools corresponding to each of the one or more component carriers of the first set of resources and the second set of resources.

In some examples, where the third set of resources includes a first subset of the third set of resources and a second subset of the third set of resources, to support transmitting the indication of the one or more communication occasions, the indication component 735 is capable of, configured to, or operable to support a means for transmitting, using the first subset of the third set of resources, an indication of one or more first communication occasions of the first set of resources of the first interface that are skipped, of one or more first component carriers of the first set of resources and including the one or more first communication occasions, of one or more first resource pools corresponding to each of the one or more first component carriers, or any combination thereof. In some examples, to support transmitting the indication of the one or more communication occasions, the indication component 735 is capable of, configured to, or operable to support a means for transmitting, using the second subset of the third set of resources, an indication of one or more second communication occasions of the second set of resources of the second interface that are skipped, of one or more second component carriers of the second set of resources and including the one or more second communication occasions, of one or more second resource pools corresponding to each of the one or more second component carriers, or any combination thereof.

In some examples, the resource selection component 760 is capable of, configured to, or operable to support a means for selecting one or more resources of the third set of resources based on the first interface and the second interface, one or more component carriers associated with the first set of resources of the first interface and the second set of resources of the second interface, and one or more resource pools associated with each of the one or more component carriers, where the indication of the one or more communication occasions is transmitted using the selected one or more resources of the third set of resources.

In some examples, to support determining to skip the one or more communication occasions, the occasion skipping component 730 is capable of, configured to, or operable to support a means for detecting one or more events including a collision associated with one or more resources of the first set of resources, the second set of resources, or a third set of resources, one or more measurements performed on the access communication link, a quantity of communications at the UE waiting to be transmitted using the first interface or the second interface, an expiration of a packet delay, or any combination thereof, where the indication of the one or more communication occasions indicates that the one or more communication occasions were skipped based on the one or more events.

In some examples, the indication component 735 is capable of, configured to, or operable to support a means for transmitting, to the communication device, a second indication of a capability of the UE to transmit the indication of the one or more communication occasions.

In some examples, the second indication of the capability indicates a capability of the UE to indicate that the one or more communication occasions are skipped based on a collision associated with one or more resources of the first set of resources, the second set of resources, or a third set of resources.

In some examples, the second indication of the capability indicates a capability of the UE to indicate that the one or more communication occasions are skipped based on one or more measurements performed on the access communication link, on a quantity of communications at the UE, on an expiration of a packet delay, or on any combination thereof.

In some examples, to support transmitting the indication of the one or more communication occasions to the communication device, the indication component 735 is capable of, configured to, or operable to support a means for transmitting the indication to the second UE via the sidelink communication link using one or more resources of the first set of resources or of a third set of resources.

In some examples, the indication is associated with a second indication transmitted by the second UE to the network entity. In some examples, the second indication is based on one or more indications transmitted by one or more UEs, the one or more indications including at least the indication transmitted by the UE.

In some examples, to support transmitting the indication of the one or more communication occasions to the communication device, the indication component 735 is capable of, configured to, or operable to support a means for transmitting the indication to the network entity via the access communication link using one or more resources of the second set of resources or of a third set of resources.

In some examples, the indication includes one or more bitmaps, one or more codepoints within a sidelink shared channel, or both.

In some examples, the collision component 750 is capable of, configured to, or operable to support a means for determining that one or more resources of the first set of resources, the second set of resources, or both, collide with a measurement gap. In some examples, the measurement component 755 is capable of, configured to, or operable to support a means for determining whether to perform one or more measurements during the measurement gap based on the collision. In some examples, the indication component 735 is capable of, configured to, or operable to support a means for transmitting, to the communication device, an indication of whether the one or more measurements are performed based on determining whether to perform the one or more measurements.

In some examples, the first configured grant indicates a set of multiple first physical uplink shared channel transmission occasions of the first set of resources. In some examples, the second configured grant indicates a set of multiple second physical uplink shared channel transmission occasions of the second set of resources. In some examples, the set of multiple first physical uplink shared channel transmission occasions, the set of multiple second physical uplink shared channel transmission occasions, or both, includes the one or more communication occasions.

Additionally, or alternatively, the communications manager 720 may support wireless communications at a receiving UE in accordance with examples as disclosed herein. In some examples, the indication component 735 is capable of, configured to, or operable to support a means for receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity. In some examples, the indication component 735 is capable of, configured to, or operable to support a means for transmitting, to the network entity, a second indication of the one or more communication occasions of the first interface and the second interface that are skipped based on receiving the indication.

In some examples, the indication includes a joint indication of one or more first communication occasions of the first set of resources of the first interface and one or more second communication occasions of the second set of resources of the second interface, the one or more communication occasions including the one or more first communication occasions and the one or more second communication occasions.

In some examples, the indication and the second indication include an indication of one or more component carriers of the first set of resources of the first interface, one or more component carriers of the second set of resources of the second interface, or both. In some examples, the one or more component carriers include the one or more communication occasions of the first set of resources and the second set of resources that are skipped.

In some examples, the indication and the second indication include an indication of one or more resource pools of each of the one or more component carriers of the first set of resources and the second set of resources. In some examples, the one or more resource pools include the one or more communication occasions of the first interface and the second interface.

In some examples, the configured grant component 725 is capable of, configured to, or operable to support a means for receiving a first configured grant indicating a third set of resources for performing communications using the first interface. In some examples, the configured grant component 725 is capable of, configured to, or operable to support a means for receiving a second configured grant indicating a fourth set of resources for performing communications using a third interface, the third interface including a second access communication link between the receiving UE and the network entity. In some examples, the occasion skipping component 730 is capable of, configured to, or operable to support a means for determining to skip one or more second communication occasions of the third set of resources of the first interface, the fourth set of resources of the third interface, or both. In some examples, the indication component 735 is capable of, configured to, or operable to support a means for transmitting, to the network entity, a third indication of the one or more second communication occasions of the first interface and the third interface that are skipped based on determining to skip the one or more second communication occasions.

In some examples, the second indication and the third indication are transmitted using one or more common resources of a fifth set of resources.

In some examples, the second indication is transmitted using a first subset of a fifth set of resources. In some examples, the third indication is transmitted using a second subset of the fifth set of resources.

In some examples, the indication component 735 is capable of, configured to, or operable to support a means for receiving, from one or more second transmitting UEs, one or more third indications of one or more second communication occasions that are skipped. In some examples, the indication component 735 is capable of, configured to, or operable to support a means for transmitting one or more fourth indications of the one or more second communication occasions that are skipped based on receiving the one or more third indications.

In some examples, the second indication and the one or more fourth indications are transmitted using one or more common resources of a third set of resources.

Figure 8:
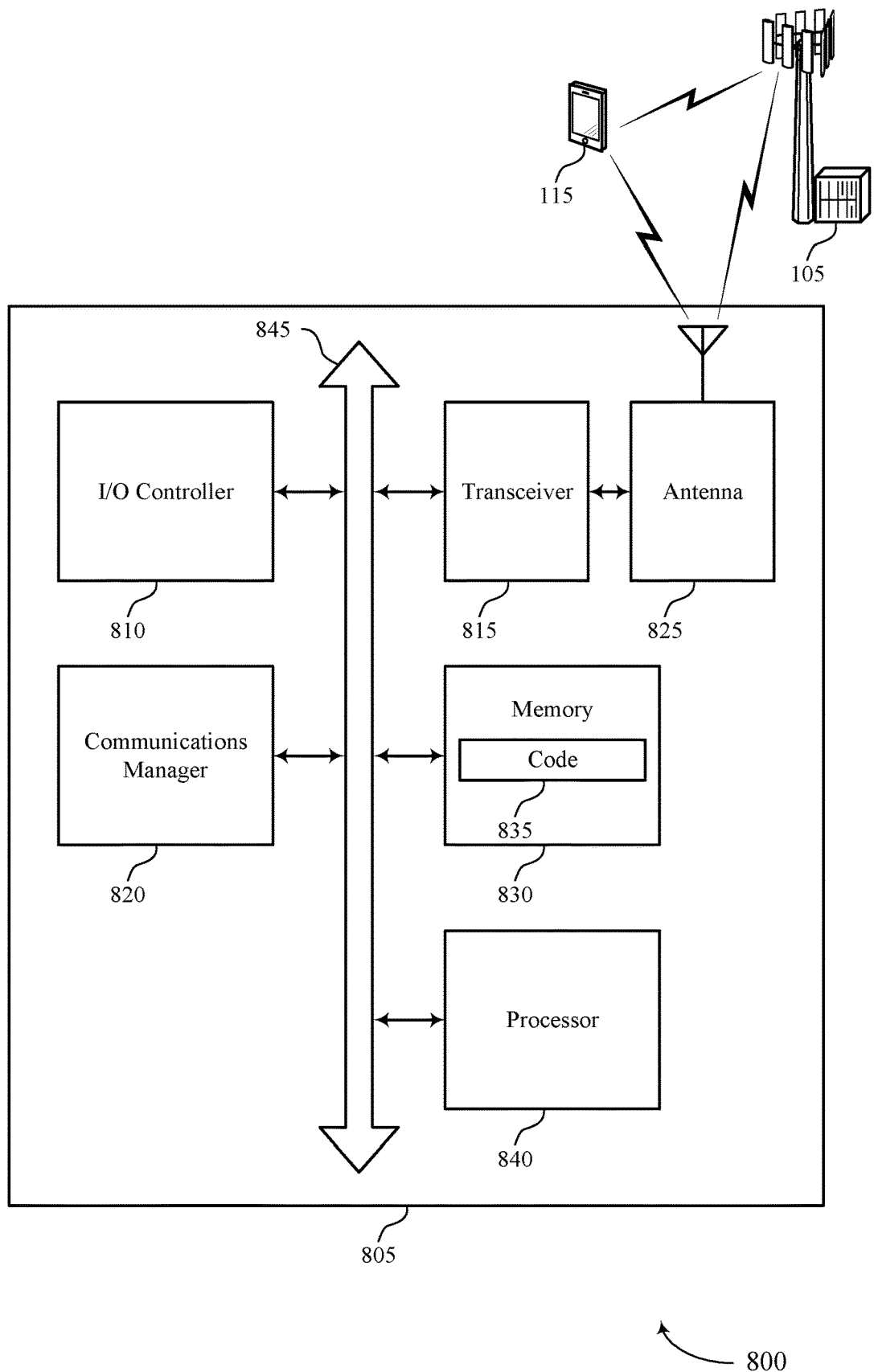
FIG. 8 shows a diagram of a system including a device that supports multiple interface resource skipping in accordance with one or more aspects of the present disclosure.

FIG. 8 shows a diagram of a system 800 including a device 805 that supports multiple interface resource skipping in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multiple interface resource skipping). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 is capable of, configured to, or operable to support a means for receiving a first configuration of a first configured grant indicating a first set of resources for performing communications using a first interface that includes a sidelink communication link between the UE and a second UE. The communications manager 820 is capable of, configured to, or operable to support a means for receiving a second configuration of a second configured grant indicating a second set of resources for performing communications using a second interface that includes an access communication link between the UE and a network entity. The communications manager 820 is capable of, configured to, or operable to support a means for determining to skip one or more communication occasions of the first set of resources of the first interface, the second set of resources of the second interface, or both. The communications manager 820 is capable of, configured to, or operable to support a means for transmitting, to a communication device, an indication of the one or more communication occasions of the first interface and the second interface that are skipped based on determining to skip the one or more communication occasions.

Additionally, or alternatively, the communications manager 820 may support wireless communications at a receiving UE in accordance with examples as disclosed herein. For example, the communications manager 820 is capable of, configured to, or operable to support a means for receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity. The communications manager 820 is capable of, configured to, or operable to support a means for transmitting, to the network entity, a second indication of the one or more communication occasions of the first interface and the second interface that are skipped based on receiving the indication.

By including or configuring the communications manager 820 in accordance with examples as described herein, the device 805 may support techniques for more efficient utilization of communication resources by using various groupings of resources and indications, reduced power consumption, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multiple interface resource skipping as described herein, or the processor 840 and the memory 830 may be otherwise configured to perform or support such operations.

Figure 9:
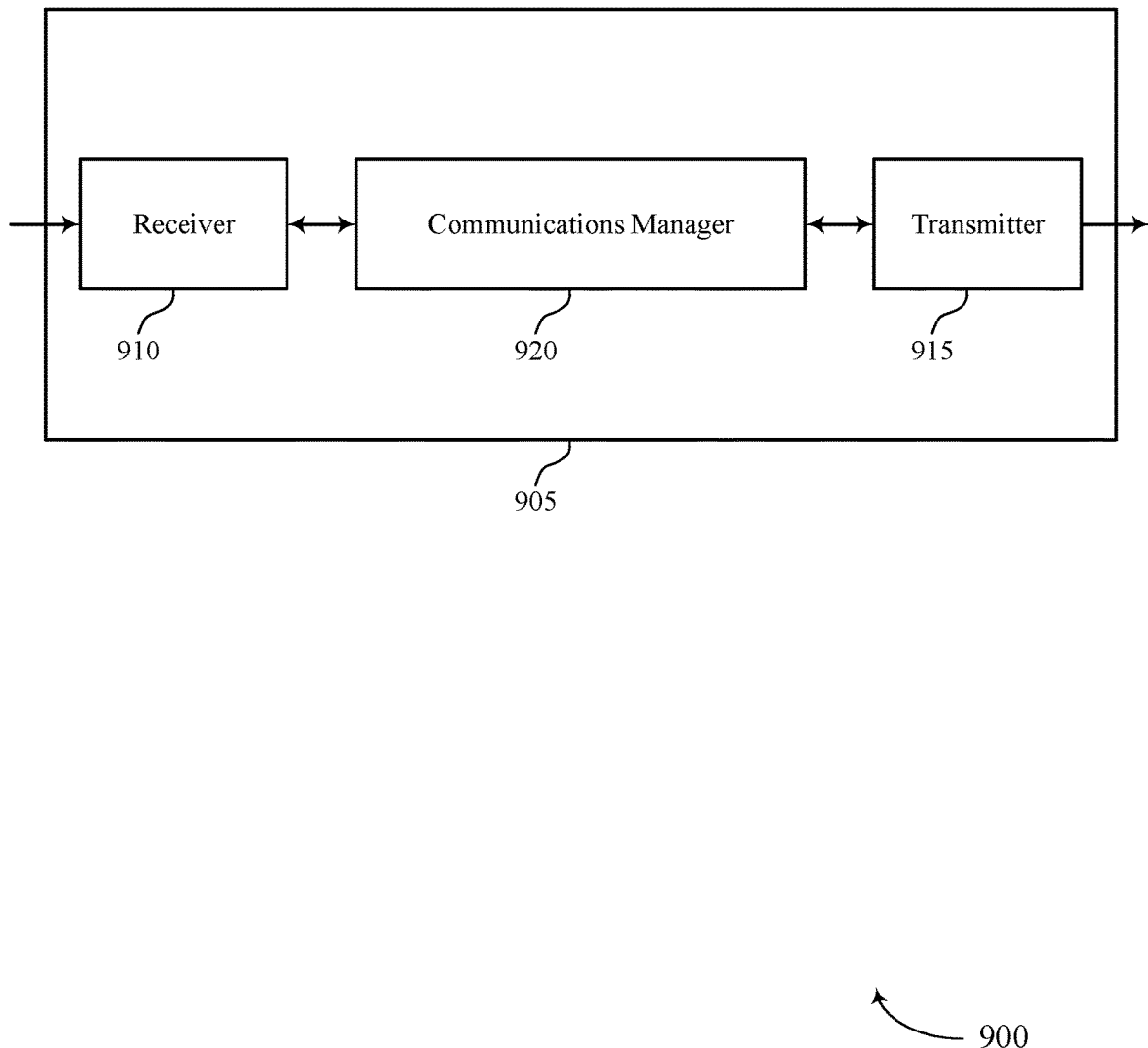
FIGS. 9 and 10 show block diagrams of devices that support multiple interface resource skipping in accordance with one or more aspects of the present disclosure.

FIG. 9 shows a block diagram 900 of a device 905 that supports multiple interface resource skipping in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multiple interface resource skipping as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 is capable of, configured to, or operable to support a means for transmitting a first configured grant indicating a first set of resources for a UE to perform communications using a first interface that includes a sidelink communication link between the UE and a second UE. The communications manager 920 is capable of, configured to, or operable to support a means for transmitting a second configured grant indicating a second set of resources for the UE to perform communications using a second interface that includes an access communication link between the UE and the network entity. The communications manager 920 is capable of, configured to, or operable to support a means for receiving an indication of one or more communication occasions of the first interface and the second interface that are skipped based on transmitting the first configured grant and the second configured grant.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources by using various groupings of resources and indications, reduced power consumption, and improved coordination between devices.

Figure 10:
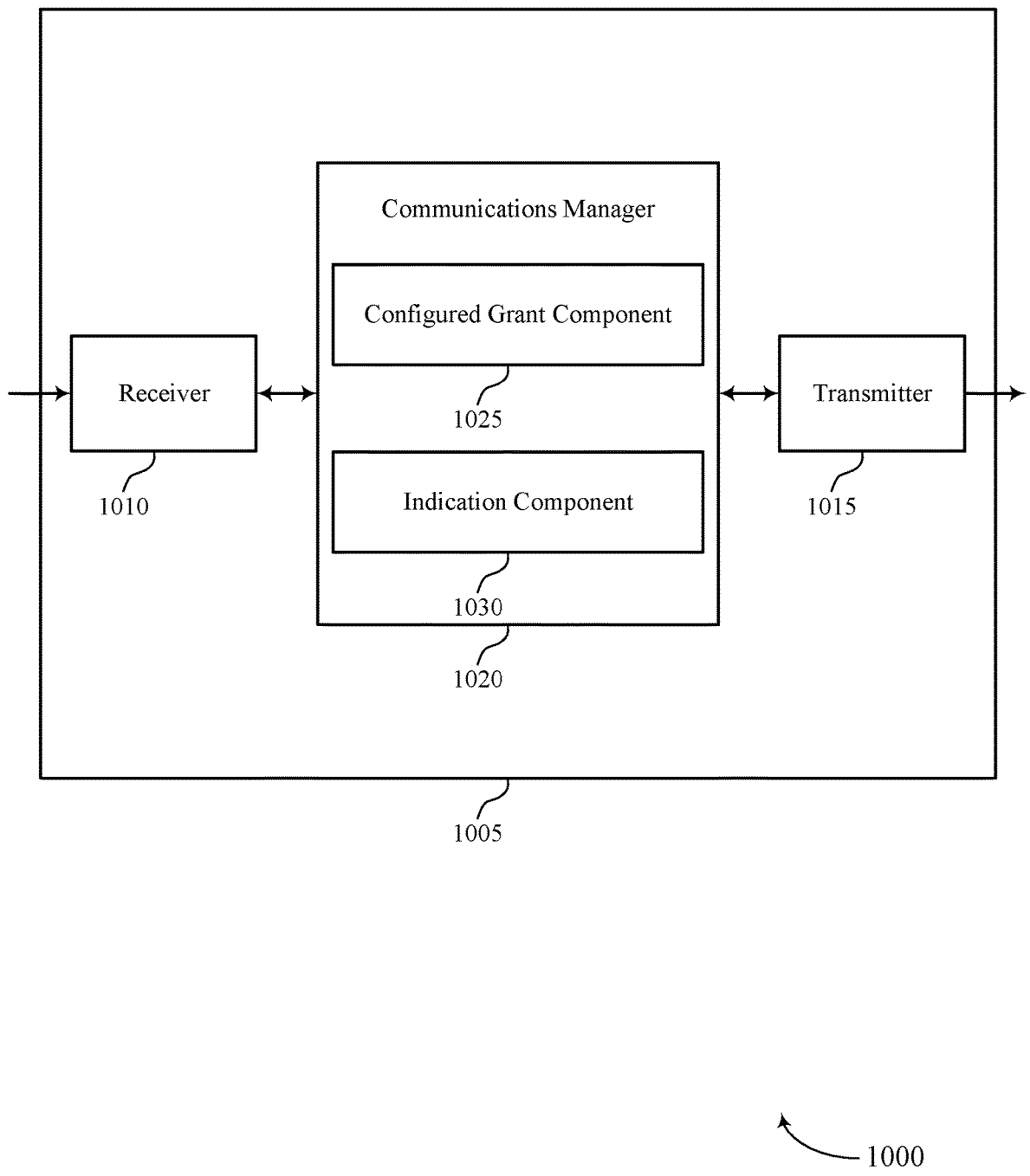

FIG. 10 shows a block diagram 1000 of a device 1005 that supports multiple interface resource skipping in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of multiple interface resource skipping as described herein. For example, the communications manager 1020 may include a configured grant component 1025 an indication component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The configured grant component 1025 is capable of, configured to, or operable to support a means for transmitting a first configured grant indicating a first set of resources for a UE to perform communications using a first interface that includes a sidelink communication link between the UE and a second UE. The configured grant component 1025 is capable of, configured to, or operable to support a means for transmitting a second configured grant indicating a second set of resources for the UE to perform communications using a second interface that includes an access communication link between the UE and the network entity. The indication component 1030 is capable of, configured to, or operable to support a means for receiving an indication of one or more communication occasions of the first interface and the second interface that are skipped based on transmitting the first configured grant and the second configured grant.

Figure 11:
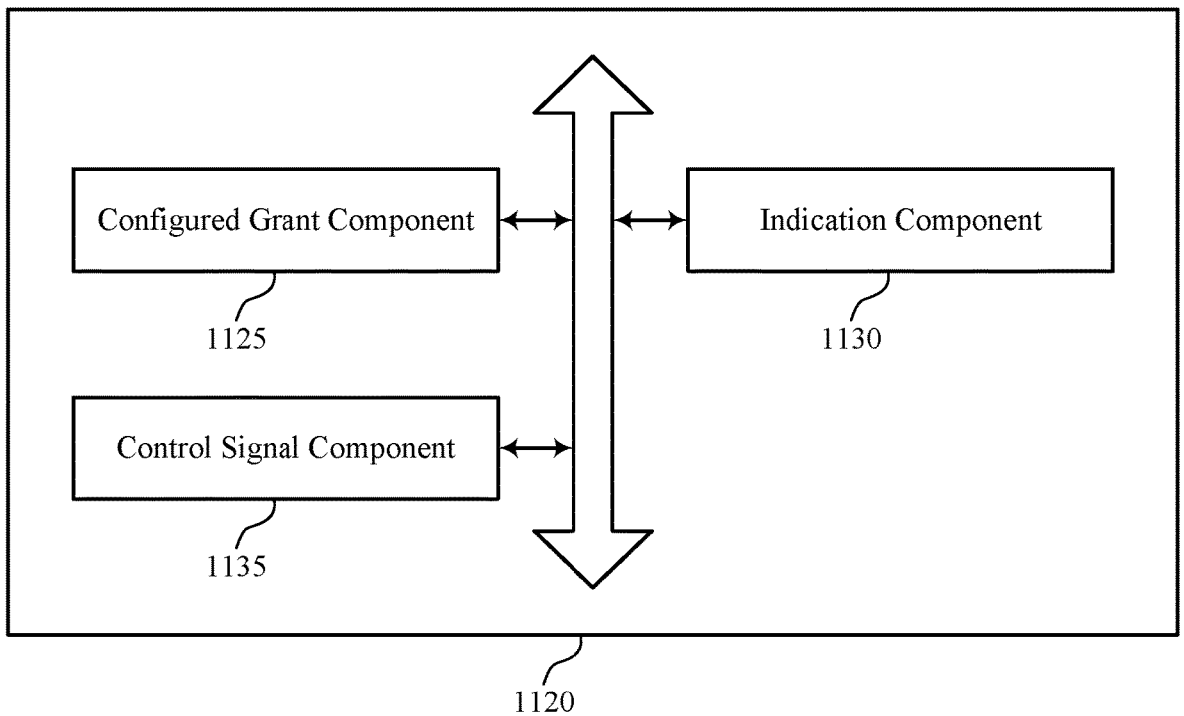
FIG. 11 shows a block diagram of a communications manager that supports multiple interface resource skipping in accordance with one or more aspects of the present disclosure.

FIG. 11 shows a block diagram 1100 of a communications manager 1120 that supports multiple interface resource skipping in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multiple interface resource skipping as described herein. For example, the communications manager 1120 may include a configured grant component 1125, an indication component 1130, a control signal component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The configured grant component 1125 is capable of, configured to, or operable to support a means for transmitting a first configured grant indicating a first set of resources for a UE to perform communications using a first interface that includes a sidelink communication link between the UE and a second UE. In some examples, the configured grant component 1125 is capable of, configured to, or operable to support a means for transmitting a second configured grant indicating a second set of resources for the UE to perform communications using a second interface that includes an access communication link between the UE and the network entity. The indication component 1130 is capable of, configured to, or operable to support a means for receiving an indication of one or more communication occasions of the first interface and the second interface that are skipped based on transmitting the first configured grant and the second configured grant.

In some examples, the indication includes a joint indication of one or more first communication occasions of the first set of resources of the first interface and one or more second communication occasions of the second set of resources of the second interface, the one or more communication occasions including the one or more first communication occasions and the one or more second communication occasions.

In some examples, to support receiving the indication of the one or more communication occasions, the indication component 1130 is capable of, configured to, or operable to support a means for receiving an indication of one or more component carriers of the first set of resources of the first interface, one or more component carriers of the second set of resources of the second interface, or both, where the one or more component carriers include the one or more communication occasions of the first interface and the second interface that are skipped.

In some examples, to support receiving the indication, the indication component 1130 is capable of, configured to, or operable to support a means for receiving an indication of one or more resource pools of each of the one or more component carriers of the first set of resources and the second set of resources, where the one or more resource pools include the one or more communication occasions of the first interface and the second interface that are skipped.

In some examples, the indication of the one or more communication occasions is received according to one or more codebooks, the one or more codebooks mapping the one or more communication occasions with one or more component carriers of the first set of resources and the second set of resources and with one or more resource pools of each of the one or more component carriers.

In some examples, the control signal component 1135 is capable of, configured to, or operable to support a means for transmitting a control signal indicating a third set of resources for transmitting the indication of the one or more communication occasions, where the indication is received using one or more resources of the third set of resources based on transmitting the control signal.

In some examples, the indication component 1130 is capable of, configured to, or operable to support a means for receiving a second indication of a capability of the UE to transmit the indication of the one or more communication occasions, where transmitting the first configured grant and the second configured grant is based on receiving the second indication.

Figure 12:
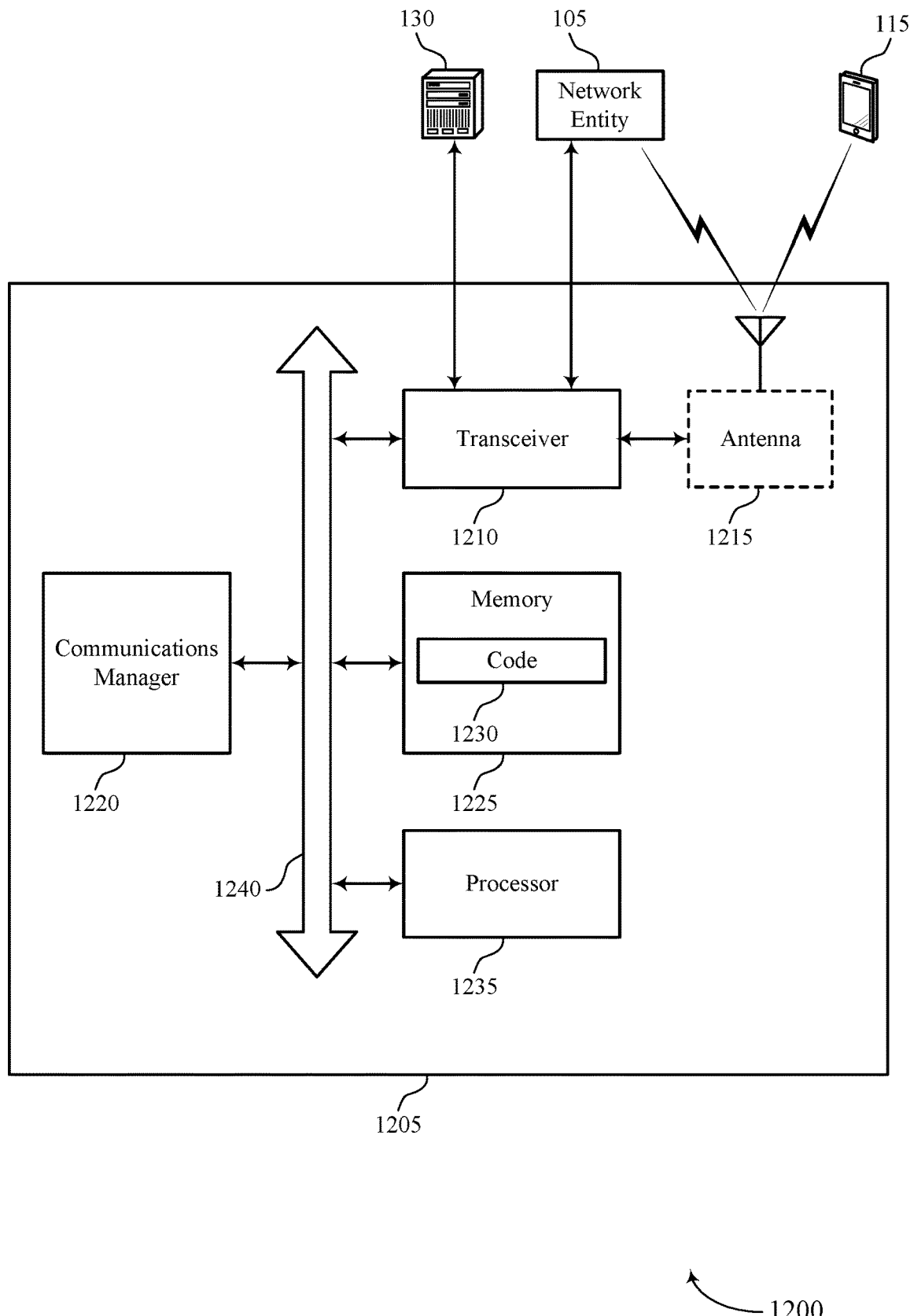
FIG. 12 shows a diagram of a system including a device that supports multiple interface resource skipping in accordance with one or more aspects of the present disclosure.

FIG. 12 shows a diagram of a system 1200 including a device 1205 that supports multiple interface resource skipping in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multiple interface resource skipping). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 is capable of, configured to, or operable to support a means for transmitting a first configured grant indicating a first set of resources for a UE to perform communications using a first interface that includes a sidelink communication link between the UE and a second UE. The communications manager 1220 is capable of, configured to, or operable to support a means for transmitting a second configured grant indicating a second set of resources for the UE to perform communications using a second interface that includes an access communication link between the UE and the network entity. The communications manager 1220 is capable of, configured to, or operable to support a means for receiving an indication of one or more communication occasions of the first interface and the second interface that are skipped based on transmitting the first configured grant and the second configured grant.

By including or configuring the communications manager 1220 in accordance with examples as described herein, the device 1205 may support techniques for may support techniques for more efficient utilization of communication resources by using various groupings of resources and indications, reduced power consumption, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of multiple interface resource skipping as described herein, or the processor 1235 and the memory 1225 may be otherwise configured to perform or support such operations.

Figure 13:
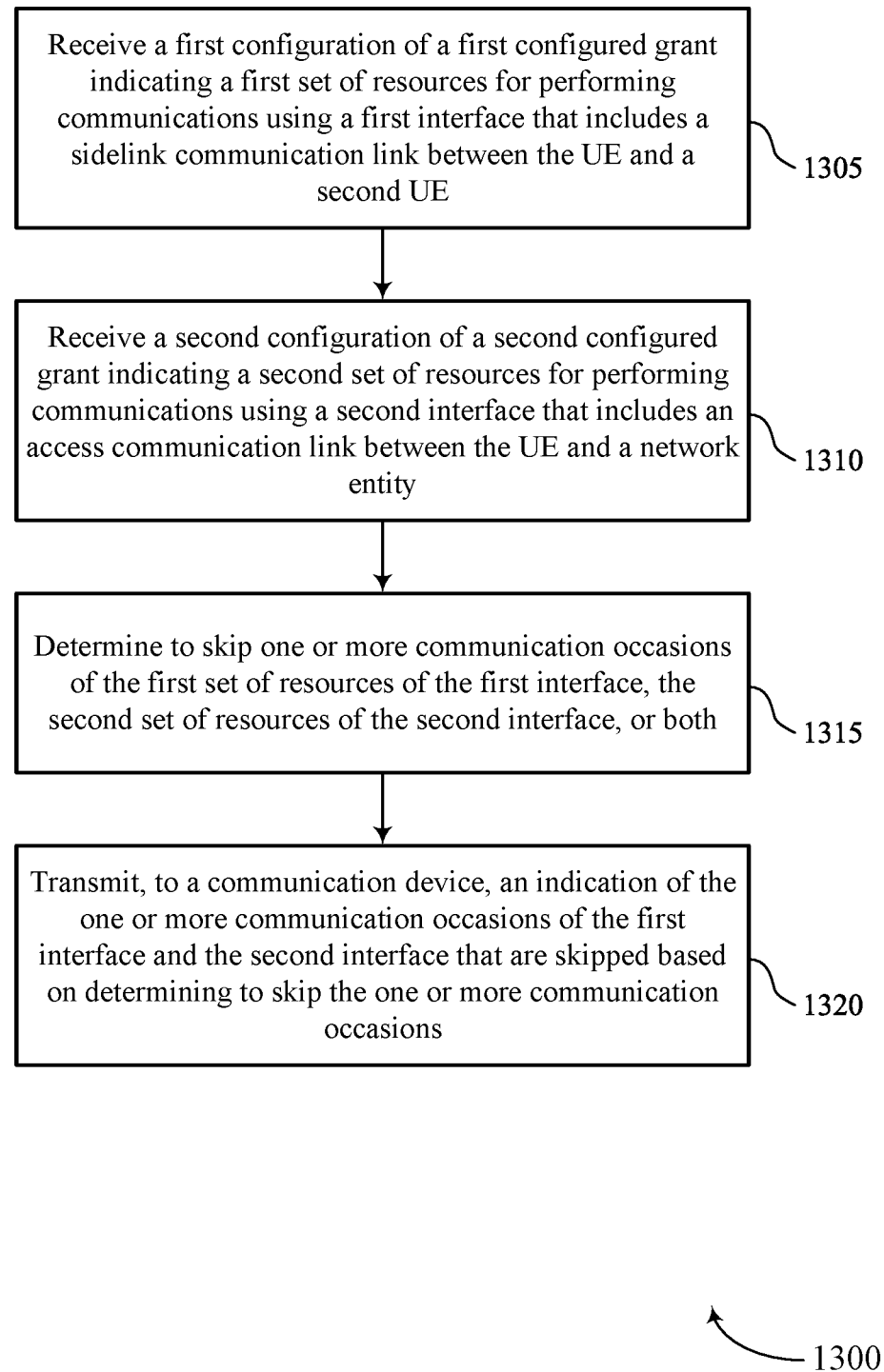
FIGS. 13 through 17 show flowcharts illustrating methods that support multiple interface resource skipping in accordance with one or more aspects of the present disclosure.

FIG. 13 shows a flowchart illustrating a method 1300 that supports multiple interface resource skipping in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving a first configuration of a first configured grant indicating a first set of resources for performing communications using a first interface that includes a sidelink communication link between the UE and a second UE. The operations of 1305 may be performed in accordance with examples as disclosed herein. In some examples, aspects of the operations of 1305 may be performed by a configured grant component 725 as described with reference to FIG. 7.

At 1310, the method may include receiving a second configuration of a second configured grant indicating a second set of resources for performing communications using a second interface that includes an access communication link between the UE and a network entity. The operations of 1310 may be performed in accordance with examples as disclosed herein. In some examples, aspects of the operations of 1310 may be performed by a configured grant component 725 as described with reference to FIG. 7.

At 1315, the method may include determining to skip one or more communication occasions of the first set of resources of the first interface, the second set of resources of the second interface, or both. The operations of 1315 may be performed in accordance with examples as disclosed herein. In some examples, aspects of the operations of 1315 may be performed by an occasion skipping component 730 as described with reference to FIG. 7.

At 1320, the method may include transmitting, to a communication device, an indication of the one or more communication occasions of the first interface and the second interface that are skipped based on determining to skip the one or more communication occasions. The operations of 1320 may be performed in accordance with examples as disclosed herein. In some examples, aspects of the operations of 1320 may be performed by an indication component 735 as described with reference to FIG. 7.

Figure 14:
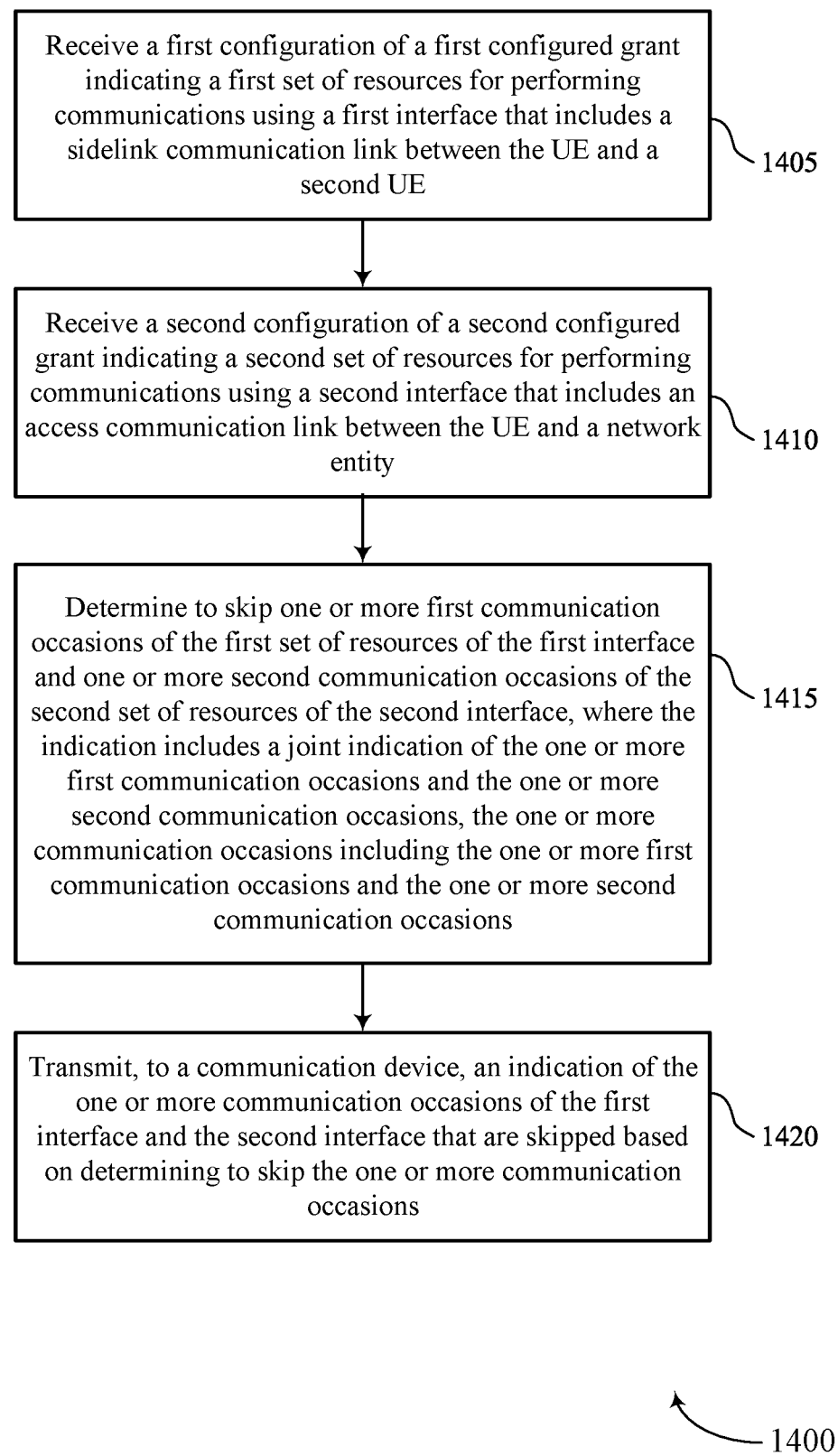

FIG. 14 shows a flowchart illustrating a method 1400 that supports multiple interface resource skipping in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1405, the method may include receiving a first configuration of a first configured grant indicating a first set of resources for performing communications using a first interface that includes a sidelink communication link between the UE and a second UE. The operations of 1405 may be performed in accordance with examples as disclosed herein. In some examples, aspects of the operations of 1405 may be performed by a configured grant component 725 as described with reference to FIG. 7.

At 1410, the method may include receiving a second configuration of a second configured grant indicating a second set of resources for performing communications using a second interface that includes an access communication link between the UE and a network entity. The operations of 1410 may be performed in accordance with examples as disclosed herein. In some examples, aspects of the operations of 1410 may be performed by a configured grant component 725 as described with reference to FIG. 7.

At 1415, the method may include determining to skip one or more first communication occasions of the first set of resources of the first interface and one or more second communication occasions of the second set of resources of the second interface, where the indication includes a joint indication of the one or more first communication occasions and the one or more second communication occasions, the one or more communication occasions including the one or more first communication occasions and the one or more second communication occasions. The operations of 1415 may be performed in accordance with examples as disclosed herein. In some examples, aspects of the operations of 1415 may be performed by an occasion skipping component 730 as described with reference to FIG. 7.

At 1420, the method may include transmitting, to a communication device, an indication of the one or more communication occasions of the first interface and the second interface that are skipped based on determining to skip the one or more communication occasions. The operations of 1420 may be performed in accordance with examples as disclosed herein. In some examples, aspects of the operations of 1420 may be performed by an indication component 735 as described with reference to FIG. 7.

Figure 15:
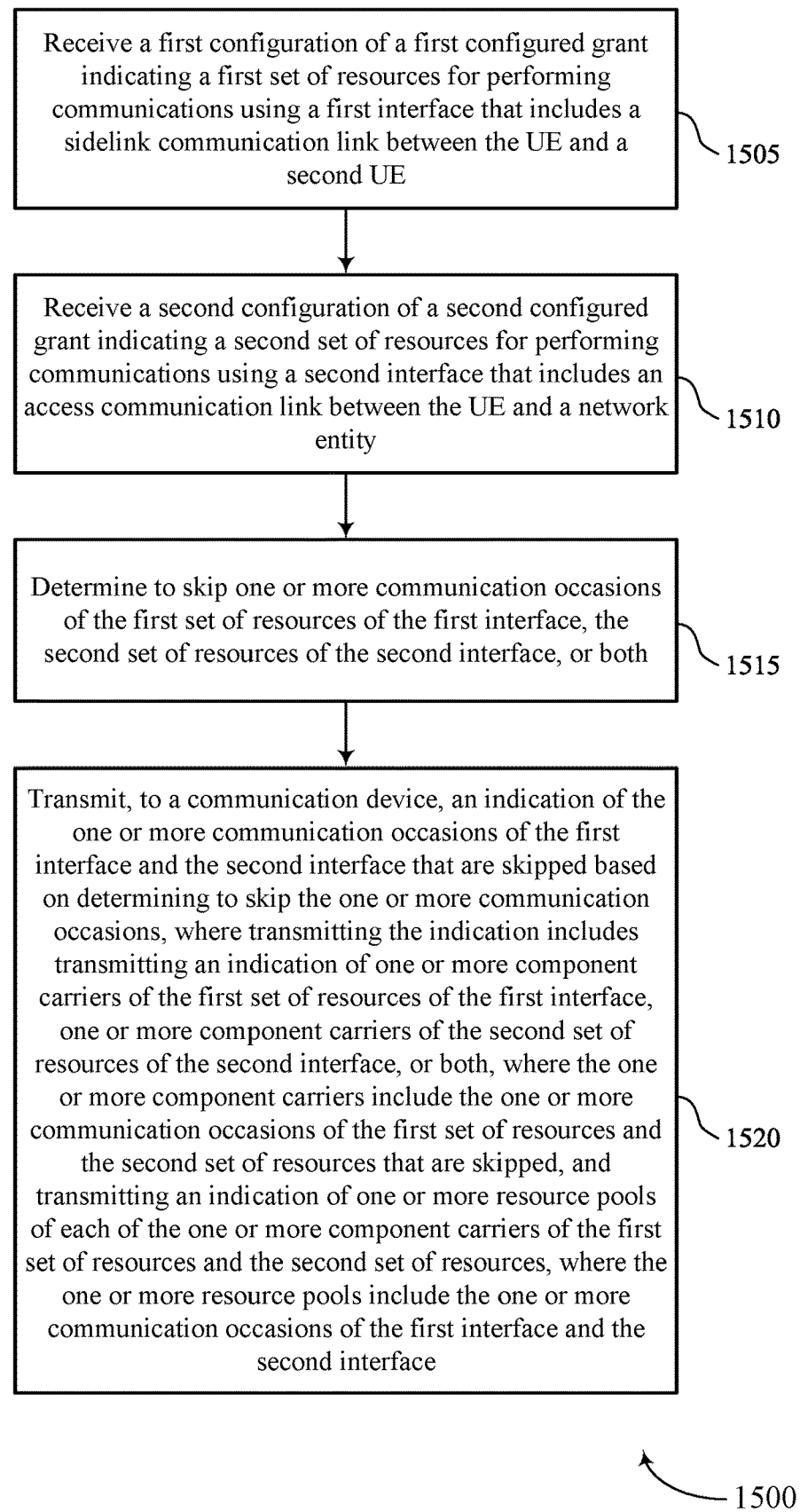

FIG. 15 shows a flowchart illustrating a method 1500 that supports multiple interface resource skipping in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1505, the method may include receiving a first configuration of a first configured grant indicating a first set of resources for performing communications using a first interface that includes a sidelink communication link between the UE and a second UE. The operations of 1505 may be performed in accordance with examples as disclosed herein. In some examples, aspects of the operations of 1505 may be performed by a configured grant component 725 as described with reference to FIG. 7.

At 1510, the method may include receiving a second configuration of a second configured grant indicating a second set of resources for performing communications using a second interface that includes an access communication link between the UE and a network entity. The operations of 1510 may be performed in accordance with examples as disclosed herein. In some examples, aspects of the operations of 1510 may be performed by a configured grant component 725 as described with reference to FIG. 7.

At 1515, the method may include determining to skip one or more communication occasions of the first set of resources of the first interface, the second set of resources of the second interface, or both. The operations of 1515 may be performed in accordance with examples as disclosed herein. In some examples, aspects of the operations of 1515 may be performed by an occasion skipping component 730 as described with reference to FIG. 7.

At 1520, the method may include transmitting, an indication of the one or more communication occasions of the first interface and the second interface that are skipped based on determining to skip the one or more communication occasions. Transmitting the indication may include transmitting an indication of one or more component carriers of the first set of resources of the first interface, one or more component carriers of the second set of resources of the second interface, or both, where the one or more component carriers include the one or more communication occasions of the first set of resources and the second set of resources that are skipped. Transmitting may also include transmitting an indication of one or more resource pools of each of the one or more component carriers of the first set of resources and the second set of resources, where the one or more resource pools include the one or more communication occasions of the first interface and the second interface. The operations of 1520 may be performed in accordance with examples as disclosed herein. In some examples, aspects of the operations of 1520 may be performed by an indication component 735 as described with reference to FIG. 7.

Figure 16:
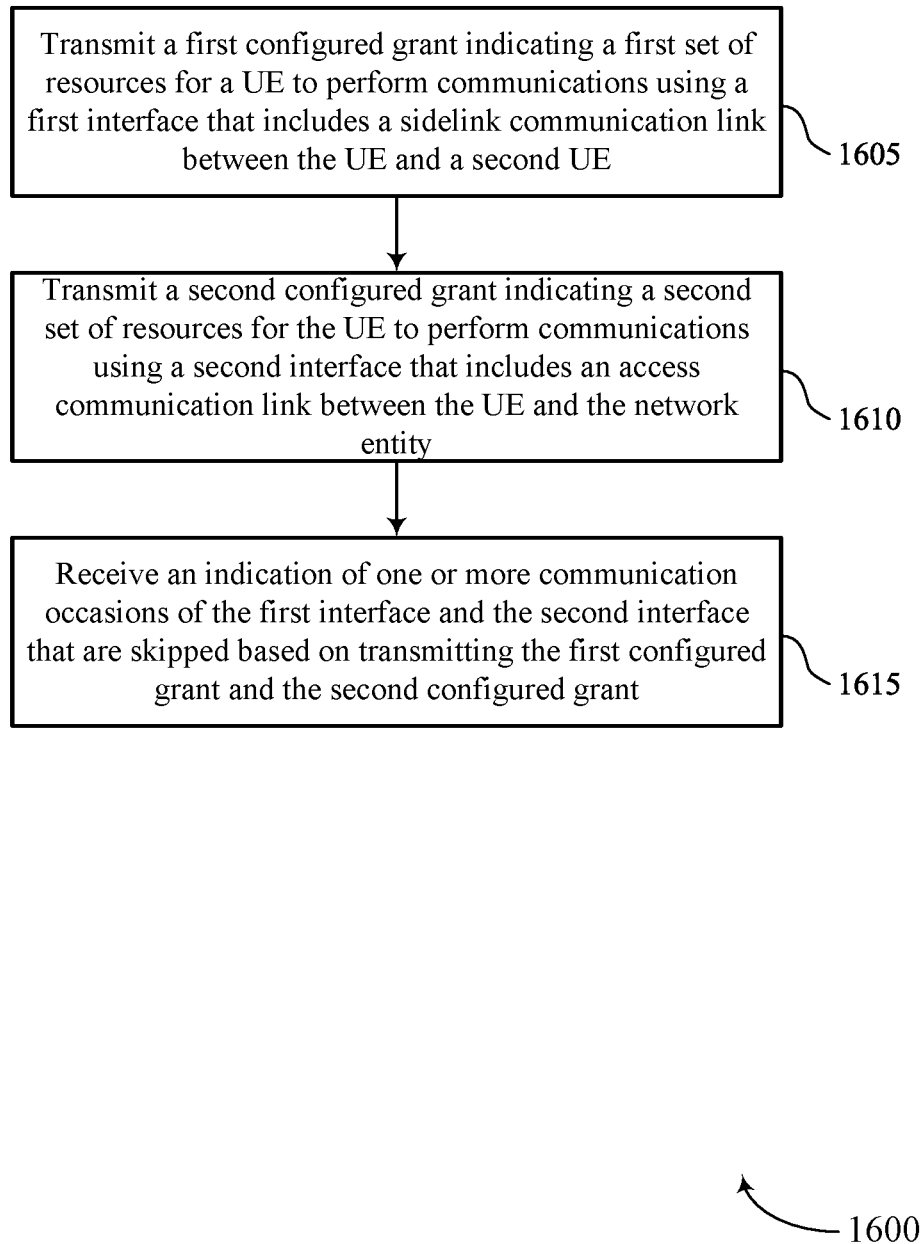

FIG. 16 shows a flowchart illustrating a method 1600 that supports multiple interface resource skipping in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the wireless network entity to perform the described functions. Additionally, or alternatively, the wireless network entity may perform aspects of the described functions using special-purpose hardware.

At 1605, the method may include transmitting a first configured grant indicating a first set of resources for a UE to perform communications using a first interface that includes a sidelink communication link between the UE and a second UE. The operations of 1605 may be performed in accordance with examples as disclosed herein. In some examples, aspects of the operations of 1605 may be performed by a configured grant component 1125 as described with reference to FIG. 11.

At 1610, the method may include transmitting a second configured grant indicating a second set of resources for the UE to perform communications using a second interface that includes an access communication link between the UE and the network entity. The operations of 1610 may be performed in accordance with examples as disclosed herein. In some examples, aspects of the operations of 1610 may be performed by a configured grant component 1125 as described with reference to FIG. 11.

At 1615, the method may include receiving an indication of one or more communication occasions of the first interface and the second interface that are skipped based on transmitting the first configured grant and the second configured grant. The operations of 1615 may be performed in accordance with examples as disclosed herein. In some examples, aspects of the operations of 1615 may be performed by an indication component 1130 as described with reference to FIG. 11.

Figure 17:
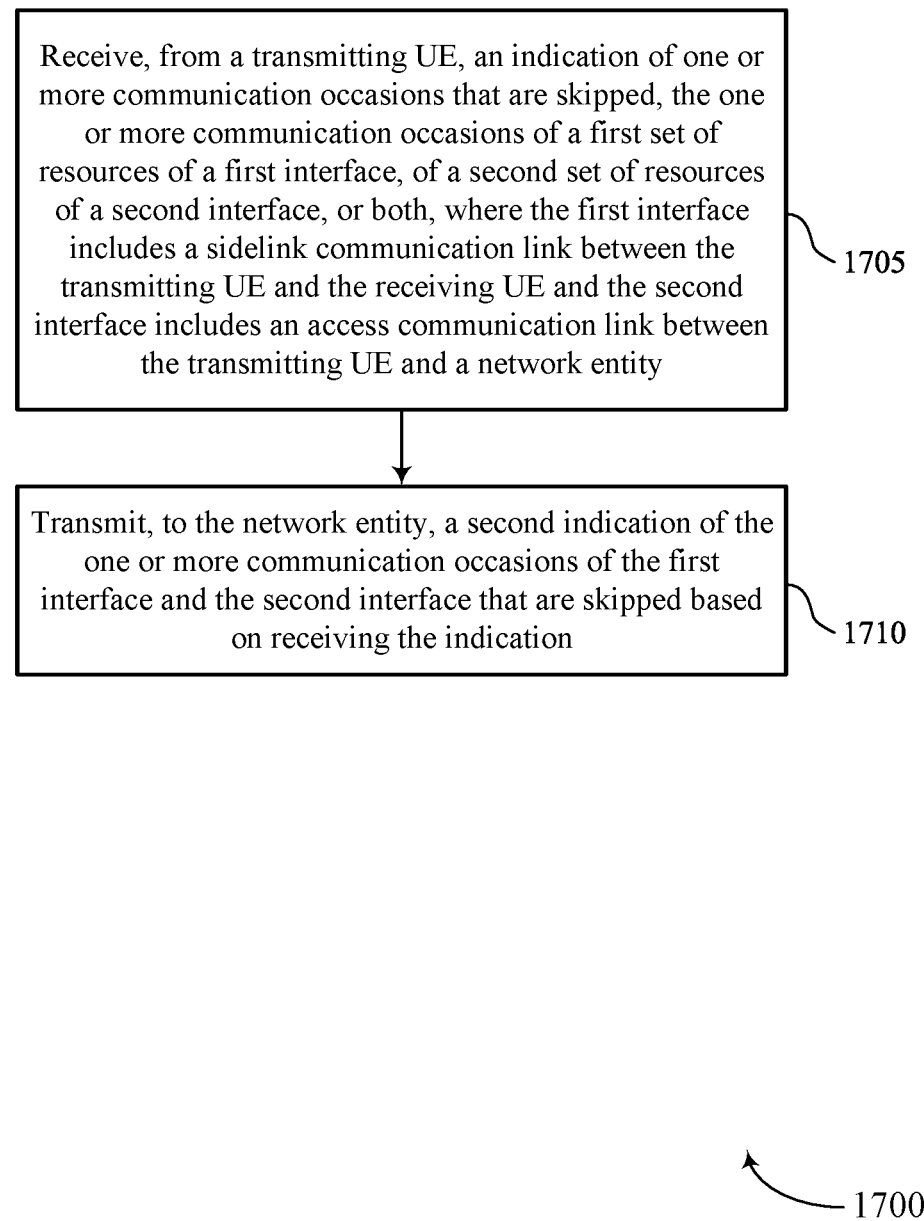

FIG. 17 shows a flowchart illustrating a method 1700 that supports multiple interface resource skipping in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving, from a transmitting UE, an indication of one or more communication occasions that are skipped, the one or more communication occasions of a first set of resources of a first interface, of a second set of resources of a second interface, or both, where the first interface includes a sidelink communication link between the transmitting UE and the receiving UE and the second interface includes an access communication link between the transmitting UE and a network entity. The operations of 1705 may be performed in accordance with examples as disclosed herein. In some examples, aspects of the operations of 1705 may be performed by an indication component 735 as described with reference to FIG. 7.

At 1710, the method may include transmitting, to the network entity, a second indication of the one or more communication occasions of the first interface and the second interface that are skipped based on receiving the indication. The operations of 1710 may be performed in accordance with examples as disclosed herein. In some examples, aspects of the operations of 1710 may be performed by an indication component 735 as described with reference to FIG. 7.

The following provides an overview of aspects of the present disclosure:

Aspect 1: A method for wireless communications at a UE, comprising: receiving a first configuration of a first configured grant indicating a first set of resources for performing communications using a first interface that comprises a sidelink communication link between the UE and a second UE; receiving a second configuration of a second configured grant indicating a second set of resources for performing communications using a second interface that comprises an access communication link between the UE and a network entity; determining to skip one or more communication occasions of the first set of resources of the first interface, the second set of resources of the second interface, or both; and transmitting, to a communication device, an indication of the one or more communication occasions of the first interface and the second interface that are skipped based at least in part on determining to skip the one or more communication occasions.

Aspect 2: The method of aspect 1, wherein determining to skip the one or more communication occasions comprises: determining to skip one or more first communication occasions of the first set of resources of the first interface and one or more second communication occasions of the second set of resources of the second interface, wherein the indication comprises a joint indication of the one or more first communication occasions and the one or more second communication occasions, the one or more communication occasions comprising the one or more first communication occasions and the one or more second communication occasions.

Aspect 3: The method of any of aspects 1 through 2, wherein transmitting the indication further comprises: transmitting an indication of one or more component carriers of the first set of resources of the first interface, one or more component carriers of the second set of resources of the second interface, or both, wherein the one or more component carriers comprise the one or more communication occasions of the first set of resources and the second set of resources that are skipped.

Aspect 4: The method of aspect 3, wherein transmitting the indication further comprises: transmitting an indication of one or more resource pools of each of the one or more component carriers of the first set of resources and the second set of resources, wherein the one or more resource pools comprise the one or more communication occasions of the first interface and the second interface.

Aspect 5: The method of any of aspects 1 through 4, further comprising: determining one or more codebooks mapping the one or more communication occasions with one or more component carriers of the first set of resources and the second set of resources and with one or more resource pools of each of the one or more component carriers, wherein the indication of the one or more communication occasions is transmitted according to the one or more codebooks.

Aspect 6: The method of aspect 5, wherein transmitting the indication in accordance with the one or more codebooks comprises multiplexing the one or more codebooks in a bit domain, in a time domain, in a frequency domain, or any combination thereof.

Aspect 7: The method of any of aspects 1 through 6, further comprising: receiving a control signal indicating a third set of resources for transmitting the indication of the one or more communication occasions.

Aspect 8: The method of aspect 7, wherein the third set of resources comprises one or more common resources, wherein transmitting the indication of the one or more communication occasions comprises: transmitting an indication of the one or more communication occasions with an indication of the first interface and the second interface, an indication of one or more component carriers of the first set of resources and the second set of resources and comprising the one or more communication occasions, and an indication of one or more resource pools corresponding to each of the one or more component carriers of the first set of resources and the second set of resources.

Aspect 9: The method of aspect 1, wherein a third set of resources comprises a first subset of the third set of resources and a second subset of the third set of resources, wherein transmitting the indication of the one or more communication occasions comprises: transmitting, using the first subset of the third set of resources, an indication of one or more first communication occasions of the first set of resources of the first interface that are skipped, of one or more first component carriers of the first set of resources and comprising the one or more first communication occasions, of one or more first resource pools corresponding to each of the one or more first component carriers, or any combination thereof; and transmitting, using the second subset of the third set of resources, an indication of one or more second communication occasions of the second set of resources of the second interface that are skipped, of one or more second component carriers of the second set of resources and comprising the one or more second communication occasions, of one or more second resource pools corresponding to each of the one or more second component carriers, or any combination thereof.

Aspect 10: The method of any of aspects 7 through 9, further comprising: selecting one or more resources of the third set of resources based at least in part on the first interface and the second interface, one or more component carriers associated with the first set of resources of the first interface and the second set of resources of the second interface, and one or more resource pools associated with each of the one or more component carriers, wherein the indication of the one or more communication occasions is transmitted using the selected one or more resources of the third set of resources.

Aspect 11: The method of any of aspects 1 through 10, wherein determining to skip the one or more communication occasions comprises: detecting one or more events comprising a collision associated with one or more resources of the first set of resources, the second set of resources, or a third set of resources, one or more measurements performed on the access communication link, a quantity of communications at the UE waiting to be transmitted using the first interface or the second interface, an expiration of a packet delay, or any combination thereof, wherein the indication of the one or more communication occasions indicates that the one or more communication occasions were skipped based at least in part on the one or more events.

Aspect 12: The method of any of aspects 1 through 11, further comprising: transmitting, to the communication device, a second indication of a capability of the UE to transmit the indication of the one or more communication occasions.

Aspect 13: The method of aspect 12, wherein the second indication of the capability indicates a capability of the UE to indicate that the one or more communication occasions are skipped based at least in part on a collision associated with one or more resources of the first set of resources, the second set of resources, or a third set of resources.

Aspect 14: The method of any of aspects 12 through 13, wherein the second indication of the capability indicates a capability of the UE to indicate that the one or more communication occasions are skipped based at least in part on one or more measurements performed on the access communication link, on a quantity of communications at the UE, on an expiration of a packet delay, or on any combination thereof.

Aspect 15: The method of any of aspects 1 through 14, wherein transmitting the indication of the one or more communication occasions to the communication device comprises: transmitting the indication to the second UE via the sidelink communication link using one or more resources of the first set of resources or of a third set of resources.

Aspect 16: The method of aspect 15, wherein the indication is associated with a second indication transmitted by the second UE to the network entity, the second indication is based at least in part on one or more indications transmitted by one or more UEs, the one or more indications comprising at least the indication transmitted by the UE.

Aspect 17: The method of any of aspects 1 through 16, wherein transmitting the indication of the one or more communication occasions to the communication device comprises: transmitting the indication to the network entity via the access communication link using one or more resources of the second set of resources or of a third set of resources.

Aspect 18: The method of any of aspects 1 through 17, wherein the indication comprises one or more bitmaps, one or more codepoints within a sidelink shared channel, or both.

Aspect 19: The method of any of aspects 1 through 18, further comprising: determining that one or more resources of the first set of resources, the second set of resources, or both, collide with a measurement gap; determining whether to perform one or more measurements during the measurement gap based at least in part on the collision; and transmitting, to the communication device, an indication of whether the one or more measurements are performed based at least in part on determining whether to perform the one or more measurements.

Aspect 20: The method of any of aspects 1 through 19, wherein the first configured grant indicates a plurality of first physical uplink shared channel transmission occasions of the first set of resources and the second configured grant indicates a plurality of second physical uplink shared channel transmission occasions of the second set of resources, the plurality of first physical uplink shared channel transmission occasions, the plurality of second physical uplink shared channel transmission occasions, or both, comprises the one or more communication occasions.

Aspect 21: A method for wireless communications at a network entity, comprising: transmitting a first configured grant indicating a first set of resources for a UE to perform communications using a first interface that comprises a sidelink communication link between the UE and a second UE; transmitting a second configured grant indicating a second set of resources for the UE to perform communications using a second interface that comprises an access communication link between the UE and the network entity; and receiving an indication of one or more communication occasions of the first interface and the second interface that are skipped based at least in part on transmitting the first configured grant and the second configured grant.

Aspect 22: The method of aspect 21, wherein the indication comprises a joint indication of one or more first communication occasions of the first set of resources of the first interface and one or more second communication occasions of the second set of resources of the second interface, the one or more communication occasions comprising the one or more first communication occasions and the one or more second communication occasions.

Aspect 23: The method of any of aspects 21 through 22, wherein receiving the indication of the one or more communication occasions comprises: receiving an indication of one or more component carriers of the first set of resources of the first interface, one or more component carriers of the second set of resources of the second interface, or both, wherein the one or more component carriers comprise the one or more communication occasions of the first interface and the second interface that are skipped.

Aspect 24: The method of aspect 23, wherein receiving the indication further comprises: receiving an indication of one or more resource pools of each of the one or more component carriers of the first set of resources and the second set of resources, wherein the one or more resource pools comprise the one or more communication occasions of the first interface and the second interface that are skipped.

Aspect 25: The method of any of aspects 21 through 24, wherein the indication of the one or more communication occasions is received according to one or more codebooks, the one or more codebooks mapping the one or more communication occasions with one or more component carriers of the first set of resources and the second set of resources and with one or more resource pools of each of the one or more component carriers.

Aspect 26: The method of any of aspects 21 through 25, further comprising: transmitting a control signal indicating a third set of resources for transmitting the indication of the one or more communication occasions, wherein the indication is received using one or more resources of the third set of resources based at least in part on transmitting the control signal.

Aspect 27: The method of any of aspects 21 through 26, further comprising: receiving a second indication of a capability of the UE to transmit the indication of the one or more communication occasions, wherein transmitting the first configured grant and the second configured grant is based at least in part on receiving the second indication.

Aspect 28: A method for wireless communications at a receiving UE, comprising: receiving, from a transmitting UE, an indication of one or more communication occasions that are skipped, the one or more communication occasions of a first set of resources of a first interface, of a second set of resources of a second interface, or both, wherein the first interface comprises a sidelink communication link between the transmitting UE and the receiving UE and the second interface comprises an access communication link between the transmitting UE and a network entity; and transmitting, to the network entity, a second indication of the one or more communication occasions of the first interface and the second interface that are skipped based at least in part on receiving the indication.

Aspect 29: The method of aspect 28, wherein the indication comprises a joint indication of one or more first communication occasions of the first set of resources of the first interface and one or more second communication occasions of the second set of resources of the second interface, the one or more communication occasions comprising the one or more first communication occasions and the one or more second communication occasions.

Aspect 30: The method of any of aspects 28 through 29, wherein the indication and the second indication comprise an indication of one or more component carriers of the first set of resources of the first interface, one or more component carriers of the second set of resources of the second interface, or both, the one or more component carriers comprise the one or more communication occasions of the first set of resources and the second set of resources that are skipped.

Aspect 31: The method of aspect 30, wherein the indication and the second indication comprise an indication of one or more resource pools of each of the one or more component carriers of the first set of resources and the second set of resources, the one or more resource pools comprise the one or more communication occasions of the first interface and the second interface.

Aspect 32: The method of any of aspects 28 through 31, further comprising: receiving a first configured grant indicating a third set of resources for performing communications using the first interface; receiving a second configured grant indicating a fourth set of resources for performing communications using a third interface, the third interface comprising a second access communication link between the receiving UE and the network entity; determining to skip one or more second communication occasions of the third set of resources of the first interface, the fourth set of resources of the third interface, or both; and transmitting, to the network entity, a third indication of the one or more second communication occasions of the first interface and the third interface that are skipped based at least in part on determining to skip the one or more second communication occasions.

Aspect 33: The method of aspect 32, wherein the second indication and the third indication are transmitted using one or more common resources of a fifth set of resources.

Aspect 34: The method of aspect 32, wherein the second indication is transmitted using a first subset of a fifth set of resources and the third indication is transmitted using a second subset of the fifth set of resources.

Aspect 35: The method of any of aspects 28 through 34, further comprising: receiving, from one or more second transmitting UEs, one or more third indications of one or more second communication occasions that are skipped; and transmitting one or more fourth indications of the one or more second communication occasions that are skipped based at least in part on receiving the one or more third indications.

Aspect 36: The method of aspect 35, wherein the second indication and the one or more fourth indications are transmitted using one or more common resources of a third set of resources.

Aspect 37: An apparatus for wireless communications at a UE, comprising a processor; memory coupled with the processor; and instructions stored in the memory and executable by the processor to cause the apparatus to perform a method of any of aspects 1 through 20.

Aspect 38: An apparatus for wireless communications at a UE, comprising at least one means for performing a method of any of aspects 1 through 20.

Aspect 39: A non-transitory computer-readable medium storing code for wireless communications at a UE, the code comprising instructions executable by a processor to perform a method of any of aspects 1 through 20.

Aspect 40: An apparatus for wireless communications at a network entity, comprising a processor; memory coupled with the processor; and instructions stored in the memory and executable by the processor to cause the apparatus to perform a method of any of aspects 21 through 27.

Aspect 41: An apparatus for wireless communications at a network entity, comprising at least one means for performing a method of any of aspects 21 through 27.

Aspect 42: A non-transitory computer-readable medium storing code for wireless communications at a network entity, the code comprising instructions executable by a processor to perform a method of any of aspects 21 through 27.

Aspect 43: An apparatus for wireless communications at a receiving UE, comprising a processor; memory coupled with the processor; and instructions stored in the memory and executable by the processor to cause the apparatus to perform a method of any of aspects 28 through 36.

Aspect 44: An apparatus for wireless communications at a receiving UE, comprising at least one means for performing a method of any of aspects 28 through 36.

Aspect 45: A non-transitory computer-readable medium storing code for wireless communications at a receiving UE, the code comprising instructions executable by a processor to perform a method of any of aspects 28 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
      receive a first configuration of a first configured grant indicating a first set of resources for performing communications using a first interface that comprises a sidelink communication link between the UE and a second UE;
      receive a second configuration of a second configured grant indicating a second set of resources for performing communications using a second interface that comprises an access communication link between the UE and a network entity;
      determine to skip one or more communication occasions of the first set of resources of the first interface, the second set of resources of the second interface, or both; and
      transmit, to a communication device, an indication of the one or more communication occasions of the first interface and the second interface that are skipped based at least in part on determining to skip the one or more communication occasions.

2. The apparatus of claim 1, wherein the instructions to determine to skip the one or more communication occasions are executable by the processor to cause the apparatus to:
   determine to skip one or more first communication occasions of the first set of resources of the first interface and one or more second communication occasions of the second set of resources of the second interface, wherein the indication comprises a joint indication of the one or more first communication occasions and the one or more second communication occasions, the one or more communication occasions comprising the one or more first communication occasions and the one or more second communication occasions.

3. The apparatus of claim 1, wherein the instructions to transmit the indication are further executable by the processor to cause the apparatus to:
   transmit an indication of one or more component carriers of the first set of resources of the first interface, one or more component carriers of the second set of resources of the second interface, or both, wherein the one or more component carriers comprise the one or more communication occasions of the first set of resources and the second set of resources that are skipped.

4. The apparatus of claim 3, wherein the instructions to transmit the indication are further executable by the processor to cause the apparatus to:
   transmit an indication of one or more resource pools of each of the one or more component carriers of the first set of resources and the second set of resources, wherein the one or more resource pools comprise the one or more communication occasions of the first interface and the second interface.

5. The apparatus of claim 1, wherein the instructions are further executable by the processor to cause the apparatus to:
   determine one or more codebooks mapping the one or more communication occasions with one or more component carriers of the first set of resources and the second set of resources and with one or more resource pools of each of the one or more component carriers, wherein the indication of the one or more communication occasions is transmitted according to the one or more codebooks.

6. The apparatus of claim 5, wherein transmitting the indication in accordance with the one or more codebooks comprises multiplexing the one or more codebooks in a bit domain, in a time domain, in a frequency domain, or any combination thereof.

7. The apparatus of claim 1, wherein the instructions are further executable by the processor to cause the apparatus to:
   receive a control signal indicating a third set of resources for transmitting the indication of the one or more communication occasions.

8. The apparatus of claim 7, wherein the third set of resources comprises one or more common resources, wherein the instructions to transmit the indication of the one or more communication occasions are executable by the processor to cause the apparatus to:
   transmit an indication of the one or more communication occasions with an indication of the first interface and the second interface, an indication of one or more component carriers of the first set of resources and the second set of resources and comprising the one or more communication occasions, and an indication of one or more resource pools corresponding to each of the one or more component carriers of the first set of resources and the second set of resources.

9. The apparatus of claim 7, wherein the third set of resources comprises a first subset of the third set of resources and a second subset of the third set of resources, wherein the instructions to transmit the indication of the one or more communication occasions are executable by the processor to cause the apparatus to:
   transmit, using the first subset of the third set of resources, an indication of one or more first communication occasions of the first set of resources of the first interface that are skipped, of one or more first component carriers of the first set of resources and comprising the one or more first communication occasions, of one or more first resource pools corresponding to each of the one or more first component carriers, or any combination thereof; and
   transmit, using the second subset of the third set of resources, an indication of one or more second communication occasions of the second set of resources of the second interface that are skipped, of one or more second component carriers of the second set of resources and comprising the one or more second communication occasions, of one or more second resource pools corresponding to each of the one or more second component carriers, or any combination thereof.

10. The apparatus of claim 7, wherein the instructions are further executable by the processor to cause the apparatus to:
select one or more resources of the third set of resources based at least in part on the first interface and the second interface, one or more component carriers associated with the first set of resources of the first interface and the second set of resources of the second interface, and one or more resource pools associated with each of the one or more component carriers, wherein the indication of the one or more communication occasions is transmitted using the selected one or more resources of the third set of resources.

11. The apparatus of claim 1, wherein the instructions to determine to skip the one or more communication occasions are executable by the processor to cause the apparatus to:
detect one or more events comprising a collision associated with one or more resources of the first set of resources, the second set of resources, or a third set of resources, one or more measurements performed on the access communication link, a quantity of communications at the UE waiting to be transmitted using the first interface or the second interface, an expiration of a packet delay, or any combination thereof, wherein the indication of the one or more communication occasions indicates that the one or more communication occasions were skipped based at least in part on the one or more events.

12. The apparatus of claim 1, wherein the instructions are further executable by the processor to cause the apparatus to:
transmit, to the communication device, a second indication of a capability of the UE to transmit the indication of the one or more communication occasions.

13. The apparatus of claim 12, wherein the second indication of the capability indicates a capability of the UE to indicate that the one or more communication occasions are skipped based at least in part on a collision associated with one or more resources of the first set of resources, the second set of resources, or a third set of resources.

14. The apparatus of claim 12, wherein the second indication of the capability indicates a capability of the UE to indicate that the one or more communication occasions are skipped based at least in part on one or more measurements performed on the access communication link, on a quantity of communications at the UE, on an expiration of a packet delay, or on any combination thereof.

15. The apparatus of claim 1, wherein the instructions to transmit the indication of the one or more communication occasions to the communication device are executable by the processor to cause the apparatus to:
transmit the indication to the second UE via the sidelink communication link using one or more resources of the first set of resources or of a third set of resources.

16. The apparatus of claim 15, wherein the indication is associated with a second indication transmitted by the second UE to the network entity, the second indication is based at least in part on one or more indications transmitted by one or more UEs, the one or more indications comprising at least the indication transmitted by the UE.

17. The apparatus of claim 1, wherein the instructions to transmit the indication of the one or more communication occasions to the communication device are executable by the processor to cause the apparatus to:
transmit the indication to the network entity via the access communication link using one or more resources of the second set of resources or of a third set of resources.

18. The apparatus of claim 1, wherein the indication comprises one or more bitmaps, one or more codepoints within a sidelink shared channel, or both.

19. The apparatus of claim 1, wherein the instructions are further executable by the processor to cause the apparatus to:
determine that one or more resources of the first set of resources, the second set of resources, or both, collide with a measurement gap;
determine whether to perform one or more measurements during the measurement gap based at least in part on the collision; and
transmit, to the communication device, an indication of whether the one or more measurements are performed based at least in part on determining whether to perform the one or more measurements.

20. The apparatus of claim 1, wherein the first configured grant indicates a plurality of first physical uplink shared channel transmission occasions of the first set of resources and the second configured grant indicates a plurality of second physical uplink shared channel transmission occasions of the second set of resources, the plurality of first physical uplink shared channel transmission occasions, the plurality of second physical uplink shared channel transmission occasions, or both, comprises the one or more communication occasions.

21. An apparatus for wireless communications at a network entity, comprising:
a processor;
memory coupled with the processor; and
instructions stored in the memory and executable by the processor to cause the apparatus to:
transmit a first configured grant indicating a first set of resources for a user equipment (UE) to perform communications using a first interface that comprises a sidelink communication link between the UE and a second UE;
transmit a second configured grant indicating a second set of resources for the UE to perform communications using a second interface that comprises an access communication link between the UE and the network entity; and
receive an indication of one or more communication occasions of the first interface and the second interface that are skipped based at least in part on transmitting the first configured grant and the second configured grant.

22. The apparatus of claim 21, wherein the indication comprises a joint indication of one or more first communication occasions of the first set of resources of the first interface and one or more second communication occasions of the second set of resources of the second interface, the one or more communication occasions comprising the one or more first communication occasions and the one or more second communication occasions.

23. The apparatus of claim 21, wherein the instructions are further executable by the processor to cause the apparatus to:
transmit a control signal indicating a third set of resources for transmitting the indication of the one or more communication occasions, wherein the indication is received using one or more resources of the third set of resources based at least in part on transmitting the control signal.

24. The apparatus of claim 21, wherein the instructions are further executable by the processor to cause the apparatus to:
receive a second indication of a capability of the UE to transmit the indication of the one or more communication occasions, wherein transmitting the first configured grant and the second configured grant is based at least in part on receiving the second indication.

25. An apparatus for wireless communications at a receiving user equipment (UE), comprising:
a processor;
memory coupled with the processor; and
instructions stored in the memory and executable by the processor to cause the apparatus to:
receive, from a transmitting UE, an indication of one or more communication occasions that are skipped, the one or more communication occasions of a first set of resources of a first interface, of a second set of resources of a second interface, or both, wherein the first interface comprises a sidelink communication link between the transmitting UE and the receiving UE and the second interface comprises an access communication link between the transmitting UE and a network entity; and
transmit, to the network entity, a second indication of the one or more communication occasions of the first interface and the second interface that are skipped based at least in part on receiving the indication.

26. The apparatus of claim 25, wherein the indication comprises a joint indication of one or more first communication occasions of the first set of resources of the first interface and one or more second communication occasions of the second set of resources of the second interface, the one or more communication occasions comprising the one or more first communication occasions and the one or more second communication occasions.

27. The apparatus of claim 25, wherein the instructions are further executable by the processor to cause the apparatus to:
receive a first configured grant indicating a third set of resources for performing communications using the first interface;
receive a second configured grant indicating a fourth set of resources for performing communications using a third interface, the third interface comprising a second access communication link between the receiving UE and the network entity;
determine to skip one or more second communication occasions of the third set of resources of the first interface, the fourth set of resources of the third interface, or both; and
transmit, to the network entity, a third indication of the one or more second communication occasions of the first interface and the third interface that are skipped based at least in part on determining to skip the one or more second communication occasions.

28. The apparatus of claim 27, wherein the second indication and the third indication are transmitted using one or more common resources of a fifth set of resources, or wherein the second indication is transmitted using a first subset of the fifth set of resources and the third indication is transmitted using a second subset of the fifth set of resources.

29. The apparatus of claim 25, wherein the instructions are further executable by the processor to cause the apparatus to:
receive, from one or more second transmitting UEs, one or more third indications of one or more second communication occasions that are skipped; and
transmit one or more fourth indications of the one or more second communication occasions that are skipped based at least in part on receiving the one or more third indications.

30. A method for wireless communications at a user equipment (UE), comprising:
receiving a first configuration of a first configured grant indicating a first set of resources for performing communications using a first interface that comprises a sidelink communication link between the UE and a second UE;
receiving a second configuration of a second configured grant indicating a second set of resources for performing communications using a second interface that comprises an access communication link between the UE and a network entity;
determining to skip one or more communication occasions of the first set of resources of the first interface, the second set of resources of the second interface, or both; and
transmitting, to a communication device, an indication of the one or more communication occasions of the first interface and the second interface that are skipped based at least in part on determining to skip the one or more communication occasions.

* * * * *